United States Patent
Abdulkhair

(10) Patent No.: US 12,275,655 B1
(45) Date of Patent: Apr. 15, 2025

(54) METAL OXIDE-BASED NANOCOMPOSITE MATERIAL FOR WATER DECONTAMINATION

(71) Applicant: IMAM MOHAMMAD IBN SAUD ISLAMIC UNIVERSITY, Riyadh (SA)

(72) Inventor: Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/954,346

(22) Filed: Nov. 20, 2024

(51) Int. Cl.
*C02F 1/28* (2023.01)
*B01J 20/02* (2006.01)
(Continued)

(52) U.S. Cl.
CPC .......... *C02F 1/281* (2013.01); *B01J 20/0218* (2013.01); *B01J 20/041* (2013.01); *B01J 20/08* (2013.01); *B01J 20/28059* (2013.01); *B01J 20/2808* (2013.01); *B01J 20/3085* (2013.01); *B01J 23/28* (2013.01); *B01J 37/084* (2013.01); *B01J 20/0248* (2013.01); *B01J 20/3078* (2013.01); *C02F 1/00* (2013.01); *C02F 1/725* (2013.01); *C02F 2101/30* (2013.01); *C02F 2103/343* (2013.01)

(58) Field of Classification Search
None
See application file for complete search history.

(56) References Cited

U.S. PATENT DOCUMENTS

| | | | | |
|---|---|---|---|---|
| 5,258,347 A * | 11/1993 | Khazai | ............... | B01J 23/28 |
| | | | | 585/630 |
| 7,067,446 B2 * | 6/2006 | Suzuki | ............... | C01G 39/006 |
| | | | | 423/594.12 |
| 2021/0188655 A1 * | 6/2021 | Karabacak | ............... | C23C 8/16 |

FOREIGN PATENT DOCUMENTS

| | | | | |
|---|---|---|---|---|
| CN | 116356423 A | | 6/2023 | |
| CN | 117861646 A | | 4/2024 | |
| WO | WO-2021068600 A1 * | | 4/2021 | ........... B01D 53/02 |

OTHER PUBLICATIONS

Almufarij, Rasmiah S.; Abdulkhair, Babiker y.; Salih, M. (Results in Chemistry, 2024, 7, 101281). (Year: 2024).*

(Continued)

*Primary Examiner* — Clare M Perrin
(74) *Attorney, Agent, or Firm* — Oblon, McClelland, Maier & Neustadt, L.L.P.

(57) ABSTRACT

A method of water decontamination includes contacting a $MoO_3@Al_2O_3$—MgO nanocomposite material with an aqueous solution to form a reaction mixture. The aqueous solution includes one or more contaminants. The method further includes mixing the reaction mixture and collecting a filtrate. The filtrate has fewer of the one or more contaminants than the aqueous solution. The $MoO_3$ content of the $MoO_3@Al_2O_3$—MgO nanocomposite material ranges from 1 wt. % to 20 wt. % of the total weight of the $MoO_3@Al_2O_3$—MgO nanocomposite material. The $MoO_3@Al_2O_3$—MgO nanocomposite material has a surface area of greater than or equal to 50 $m^2/g$.

20 Claims, 18 Drawing Sheets

(51) Int. Cl.
    *B01J 20/04*     (2006.01)
    *B01J 20/08*     (2006.01)
    *B01J 20/28*     (2006.01)
    *B01J 20/30*     (2006.01)
    *B01J 23/28*     (2006.01)
    *B01J 37/08*     (2006.01)
    *C02F 1/00*     (2023.01)
    *C02F 1/72*     (2023.01)
    *C02F 101/30*     (2006.01)
    *C02F 103/34*     (2006.01)

(56) References Cited

OTHER PUBLICATIONS

Machine translation of WO-2021068600-A1, pp. 1-27. (Year: 2021).*
Xiaogang Zheng, et al., "Efficient solar-light photodegradation of tetracycline hydrochloride using BiVO4/MoQ3 Composites", Colloids and Surfaces A: Physicochemical and Engineering Aspects, vol. 621, Jul. 20, 2021, 126599, 9 pages.
Hong Guo, et al., "Precursor-oriented design of nano-alumina for efficient removal of antibiotics", Science of The Total Environment, vol. 909, Jan. 20, 2024, 168490, 8 pages.

* cited by examiner

METAL OXIDE-BASED NANOCOMPOSITE MATERIAL FOR WATER DECONTAMINATION

STATEMENT REGARDING PRIOR DISCLOSURE BY THE INVENTORS

Aspects of the present disclosure are described in Abdulkhair, B., et. al, "Fast-simplistic fabrication of $MoO_3@Al_2O_3$—MgO triple nanocomposites for efficient elimination of pharmaceutical contaminants" Results in Chemistry, Volume 7, 2024, which is incorporated herein by reference in its entirety.

STATEMENT OF ACKNOWLEDGEMENT

Support provided by the Deputyship for Research & Innovation, Ministry of Education in Saudi Arabia is gratefully acknowledged.

BACKGROUND

Technical Field

The present disclosure is directed to water decontamination techniques and, more particularly, to a method of water decontamination using metal oxide-based nanocomposites.

Description of Related Art

The "background" description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

With the advent of civilization, water decontamination has increased multi-fold and poses a serious threat to the livelihood of various lifeforms. Water contamination refers to the presence of harmful substances in water, which may include chemical pollutants, microbial pathogens, heavy metals, and toxic compounds. The contaminants may originate from industrial discharges, agricultural runoff, sewage leaks, and household waste, among other sources. Chemical pollutants like pesticides, fertilizers, and pharmaceutical residues may disrupt aquatic ecosystems and pose health risks to humans and animals. Further, population growth exponentially increased dairy and poultry needs, facilitating the extensive use of antibiotics in dairy and poultry farming practices [See: Halloran, J.J.C.u.P., and a.f.c. *reports, the overuse of antibiotics in food animals threatens public health*]. Furthermore, increasing amount of pharmaceutical contaminants (PhCs) are being discharged into the environment, and many of them have been found in water, sludge, soil, and sediments [See: M. Salih, B. Y. Abdulkhair, M. Alotaibi, *Insight into the adsorption behavior of carbon nanoparticles derived from coffee skin waste for remediating water contaminated with pharmaceutical ingredients*]. These PhCs include sulfamethoxazole, erythromycin, carbamazepine, ciprofloxacin, and TTCs [See: Elamin, M. R., B. Y. Abdulkhair, and A. O. Elzupir, *Removal of ciprofloxacin and indigo carmine from water by carbon nanotubes fabricated from a low-cost precursor: Solution parameters and recyclability*, and Díaz-Cruz, M. S. and D.J.T.T.i.A.C. Barceló, *Recent advances in LC-MS residue analysis of veterinary medicines in the terrestrial environment*]. The Tetracycline (TTC) family of antibiotics is a broad-spectrum antibiotic, and chlortetracycline (CTTC) is one of the most prescribed antibiotics for livestock medications and fertility enhancement for intermediation in dairy and poultry farming. Antibiotic use is a concern since antibiotics undergo partial metabolization, and the rest is excreted unaltered into urine and feces to sewages and eventually to water resources. The high concentration of antibiotics in seawater has been confirmed by numerous studies, raising concerns about the safety of releasing effluent into the ocean. The aforementioned PhCs may cause endocrine disruption and antibiotic resistance in living beings. The reproduction of terrestrial and aquatic animals may exemplify the damages of prolonged low-dose exposure to PhCs. Renal failure, cancer, congenital impairments, and other diseases spread as consequences of contaminating water resources. Hence, there is a pressing need for large-scale water decontamination and purification methods that are efficient and sustainable. Water purification methods include, but are not limited to, membranes, oxidation, precipitation, coagulation, aerobic decomposition, and bacterial destruction. While the aforementioned approaches are effective at water purification, they still have drawbacks and limitations in terms of absolute decontamination, specifically from PhCs. Hence, when compared to traditional water treatment methods, as mentioned above, nanomaterials possess improvements in solving environmental problems via photocatalysis and adsorption processes. Photocatalytic degradation and adsorption are some examples of water treatment methods incorporating nanomaterials. In particular, adsorption may have low energy requirements, high capacity, increased efficacy in removing a wide range of contaminants, and ease of reusability. Hence, adsorption may be an effective water treatment method in light of chemical contaminants like PhCs. However, present adsorption methods and sorbents utilized have certain drawbacks such as, but are not limited to, high cost, low sustainability, poor reusability, and cumbersome manufacturing processes.

Accordingly, one object of the present disclosure is to provide a method of synthesizing a nanocomposite and utilizing the synthesized nanocomposite for water decontamination that may circumvent the drawbacks, such as economic limitations, environmental limitations, and poor reusability, of methods and materials known in the art.

SUMMARY

In an exemplary embodiment, a method of water decontamination is described. The method includes contacting a $MoO_3@Al_2O_3$—MgO nanocomposite material with an aqueous solution to form a reaction mixture. The aqueous solution includes one or more contaminants. The method further includes mixing the reaction mixture and collecting a filtrate. The filtrate has fewer of the one or more contaminants than the aqueous solution. The molybdenum oxide ($MoO_3$) content of the $MoO_3@Al_2O_3$—MgO nanocomposite material ranges from 1 percent by weight (wt. %) to 20 wt. % of the total weight of the $MoO_3@Al_2O_3$—MgO nanocomposite material. The $MoO_3@Al_2O_3$—MgO nanocomposite material has a surface area of greater than or equal to 50 square meter per gram ($m^2/g$).

In some embodiments, the $MoO_3$ content of the $MoO_3@Al_2O_3$—MgO nanocomposite material ranges from 3 wt. % to 12 wt. % of the total weight of the $MoO_3@Al_2O_3$—MgO nanocomposite material.

In some embodiments, the $MoO_3$ content of the $MoO_3@Al_2O_3$—MgO nanocomposite material ranges from 5 wt. % to 10 wt. % of the total weight of the MoO$_3$@Al$_2$O$_3$—MgO nanocomposite material.

In some embodiments, the MoO$_3$@Al$_2$O$_3$—MgO nanocomposite material has a surface area of greater than or equal to 70 m$^2$/g.

In some embodiments, the MoO$_3$@Al$_2$O$_3$—MgO nanocomposite material has a surface area of greater than or equal to 100 m$^2$/g.

In some embodiments, the adsorption capacity of the MoO$_3$@Al$_2$O$_3$—MgO nanocomposite material for chlortetracycline is greater than or equal to 90 milligrams per gram (mg/g).

In some embodiments, the adsorption capacity of the MoO$_3$@Al$_2$O$_3$—MgO nanocomposite material for chlortetracycline is greater than or equal to 120 mg/g.

In some embodiments, the average pore diameter of the MoO$_3$@Al$_2$O$_3$—MgO nanocomposite material is greater than or equal to 8 angstroms.

In some embodiments, the average pore diameter of the MoO$_3$@Al$_2$O$_3$—MgO nanocomposite material is greater than or equal to 10 angstroms.

In some embodiments, the specific pore volume of the MoO$_3$@Al$_2$O$_3$—MgO nanocomposite material is greater than or equal to 0.300 cubic centimeter per gram (cm$^3 \cdot$g$^{-1}$).

In some embodiments, the specific pore volume of the MoO$_3$@Al$_2$O$_3$—MgO nanocomposite material is greater than or equal to 0.425 cm$^3 \cdot$g$^{-1}$.

In another embodiment, a method for synthesizing a MoO$_3$@Al$_2$O$_3$—MgO nanocomposite material is described. The method includes adding distilled water and HNO$_3$ to a powder mixture of Al(NO$_3$)$_3 \cdot$9H$_2$O, Mg(Ac)$_2 \cdot$4H$_2$O, MoO$_3$, and sucrose to form a reaction mixture, and heating the reaction mixture to a reaction temperature in a range of 150° C. to 200° C. until a carbonized product is formed. The method further includes grinding of the carbonized product to form a ground carbonized product and calcining that at a temperature ranges from 700° C. to 800° C. for a period of 2 to 4 hours to form the MoO$_3$@Al$_2$O$_3$—MgO nanocomposite material.

In some embodiments, the MoO$_3$ content of the MoO$_3$@Al$_2$O$_3$—MgO nanocomposite material ranges from 1 wt. % to 20 wt. % of the total weight of the MoO$_3$@Al$_2$O$_3$—MgO nanocomposite material.

In some embodiments, the MoO$_3$ content of the MoO$_3$@Al$_2$O$_3$—MgO nanocomposite material ranges from 5 wt. % to 10 wt. % of the total weight of the MoO$_3$@Al$_2$O$_3$—MgO nanocomposite material.

In some embodiments, the MoO$_3$@Al$_2$O$_3$—MgO nanocomposite material has a surface area of greater than or equal to 70 m$^2$/g.

In some embodiments, the MoO$_3$@ Al$_2$O$_3$—MgO nanocomposite material has a surface area of greater than or equal to 100 m$^2$/g.

In some embodiments, the adsorption capacity of the MoO$_3$@Al$_2$O$_3$—MgO nanocomposite material for chlortetracycline is greater than or equal to 90 mg/g.

In some embodiments, the adsorption capacity of the MoO$_3$@Al$_2$O$_3$—MgO nanocomposite material for chlortetracycline is greater than or equal to 120 mg/g.

In some embodiments, the average pore diameter of the MoO$_3$@Al$_2$O$_3$—MgO nanocomposite material is greater than or equal to 8 angstroms.

In some embodiments, the specific pore volume of the MoO$_3$@Al$_2$O$_3$—MgO nanocomposite material is greater than or equal to 0.300 cm$^3 \cdot$g$^{-1}$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
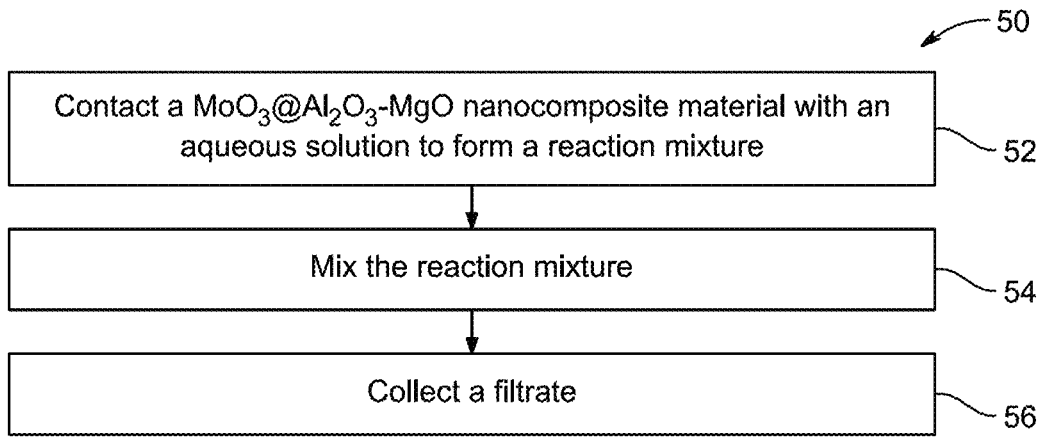
FIG. 1A is a flow chart depicting a method of water decontamination, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "water decontamination" refers to the process of removing harmful substances, pollutants, or microorganisms from water to make it safe for human use, environmental discharge, or other applications. This process can involve physical, chemical, or biological methods, including filtration, chemical treatment, or the use of advanced technologies like ultraviolet light or ozone treatment. The terms "purify/purification" and "decontaminate/decontamination" are used interchangeably herein.

As used herein, the term 'contaminants' refer to the harmful substances or pollutants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'filtrate' refers to the liquid or substance that has passed through a filter, having been separated from solid particles or impurities during the filtration process. In the context of water treatment or laboratory processes, filtrate is the clear liquid that remains after a mixture has been filtered to remove suspended solids, bacteria, or other contaminants. The filtrate typically contains the dissolved components that were not caught by the filter, making it cleaner or purer than the original solution.

As used herein, the term 'pore' refers to the small opening or void within a material, typically on the microscopic or nanoscopic scale, that allows the passage of fluids or gases. Pores determine the material's porosity and can influence properties like surface area, adsorption capacity, and reactivity. They are common in materials like porous ceramics, catalysts, and adsorbents, where they facilitate interactions between the material and the surrounding environment.

As used herein, the term 'pore volume' refers to the total volume of the pores within a material. It is typically expressed in units of cubic centimeters per gram ($cm^3/g$) and indicates the capacity of the material to hold fluids or gases. High pore volume is particularly advantageous in applications like catalysis, adsorption, and gas storage, where large amounts of material are required to interact with the medium. A larger pore volume allows for more extensive surface interactions, improving the material's efficiency in these processes.

As used herein, the term 'pore diameter' refers to the average size of the pores in a material, typically measured in nanometers (nm) or micrometers (μm). It plays a role in determining the material's behavior in specific applications. Pore size is often categorized into micropores (less than 2 nm), mesopores (2-50 nm), and macropores (greater than 50 nm). The pore diameter influences how well the material can adsorb or filter particular molecules, making it a factor in designing materials for tasks like adsorption, catalysis, filtration, or drug delivery.

As used herein, the term 'adsorption capacity' refers to the maximum amount of a substance that can be adsorbed onto the surface of a material, typically expressed in terms of weight or volume of adsorbate per unit mass or volume of the adsorbent. It is a measure of the material's ability to attract and hold molecules from a gas or liquid phase onto its surface, usually due to intermolecular forces such as van der Waals forces, hydrogen bonding, or electrostatic interactions.

Aspects of this disclosure are directed to a method of water decontamination using $MoO_3$@$Al_2O_3$MgO nanocomposites, particularly for effective removal of chloro-tetracycline (CTTC). The nanocomposites exhibit high adsorption capacities particularly in terms of CTTC removal efficiency and reusability. The method is designed for environmentally relevant conditions and offers a sustainable, scalable approach for regenerating and reusing the sorbent. By overcoming limitations of prior methods, this technology provides a practical and thermodynamically favorable solution for mitigating antibiotic pollution in water, contributing to both public health and environmental sustainability.

FIG. 1A illustrates a flow chart of a method 50 for of water decontamination. Water decontamination refers to the process of removing harmful pollutants, toxins, microorganisms, or undesirable substances from water to make it safe for consumption, environmental use, or industrial applications. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes contacting a $MoO_3$@$Al_2O_3$—MgO nanocomposite material with an aqueous solution to form a reaction mixture. The $MoO_3$@$Al_2O_3$—MgO nanocomposite combines the properties of molybdenum trioxide ($MoO_3$), alumina ($Al_2O_3$), and magnesium oxide (MgO) in a nanocomposite structure. The $MoO_3$ provides active sites that enhance adsorption capabilities, while $Al_2O_3$ and MgO serve as a matrix that contribute to the high surface area, chemical inertness, and stability.

The $MoO_3$ content of the $MoO_3@Al_2O_3$—MgO nanocomposite material is in a range from 1 to 20 wt. %, preferably 3 to 15 wt. %, preferably 3 to 12 wt. %, preferably 5 to 10 wt. % of the total weight of the $MoO_3@Al_2O_3$—MgO nanocomposite material. In a preferred embodiment, the $MoO_3$ content in the nanocomposite material is about 5 wt. % of the total weight of the $MoO_3@Al_2O_3$—MgO nanocomposite material. Morphological analysis shows that the $MoO_3@Al_2O_3$—MgO nanocomposite material has an average particle size in the range of 42.8-54.9 nm, 33.6-44.5 nm, and 39.3-44.9 nm. In one or more embodiments, the average particle size of the $MoO_3@Al_2O_3$—MgO nanocomposite material is in a range from 10 to 200 nm, preferably 20 to 100 nm, more preferably 20 to 70 nm. These particles may aggregate into larger sizes when the material is dried. Larger aggregates of smaller particles can be disaggregated and dispersed through mixing in the reaction mixture.

The $MoO_3@Al_2O_3$—MgO nanocomposite material has a surface area of greater than or equal to 40 $m^2/g$, preferably greater than or equal to 50 $m^2/g$, preferably greater than 55 $m^2/g$, preferably greater than 60 $m^2/g$, preferably greater than 65 $m^2/g$, preferably greater than 70 $m^2/g$, preferably greater than 75 $m^2/g$, preferably greater than 80 $m^2/g$, preferably greater than 85 $m^2/g$, preferably greater than 90 $m^2/g$, preferably greater than 95 $m^2/g$, preferably greater than 100 $m^2/g$, preferably greater than 105 $m^2/g$, preferably greater than 110 $m^2/g$. In a specific embodiment, the $MoO_3@Al_2O_3$—MgO nanocomposite material has a surface area in the range of 110-115 $m^2/g$, preferably about 112.786 $m^2/g$.

The average pore diameter of the $MoO_3@Al_2O_3$—MgO nanocomposite material is greater than or equal to 7 angstroms preferably greater than or equal to 8 angstroms, preferably greater than or equal to 9 angstroms, preferably greater than or equal to 10 angstroms. In one embodiment, the average pore diameter of the $MoO_3@Al_2O_3$—MgO nanocomposite material is about 10.500 angstroms. In some embodiments, the average pore diameter of the $MoO_3@Al_2O_3$—MgO nanocomposite material is about 11.45 angstroms.

The specific pore volume of the $MoO_3@Al_2O_3$—MgO nanocomposite material is greater than or equal to 0.200 $cm^3 \cdot g^{-1}$, preferably greater than or equal to 0.300 $cm^3 \cdot g^{-1}$, preferably greater than or equal to 0.4 $cm^3 \cdot g^{-1}$. In a specific embodiment, the specific pore volume of the $MoO_3@Al_2O_3$—MgO nanocomposite material is greater than or equal to 0.425 $cm^3 \cdot g^{-1}$. In another embodiment, the specific pore volume of the $MoO_3@Al_2O_3$—MgO nanocomposite material is about 0.457 $cm^3 \cdot g^{-1}$.

The $MoO_3@Al_2O_3$—MgO nanocomposite material nanocomposite is contacted with the aqueous solution. The aqueous solution includes water collected from various sources, including but not limited to seawater, brackish coastal waters, wastewater, contaminated water, saline or contaminated saline water, streams (including streams near the ocean), and the like. Other feed streams can originate from a variety of sources. For example, in certain embodiments, at least a portion of the stream fed to the method comprises and/or is derived from water from an oil or gas well, and/or the effluent of a chemical process (e.g., the effluent of another purification system, or another chemical process), can also be used. In some embodiments, the aqueous solution for water decontamination may comprise a mixture of synthetic wastewater containing dyes, heavy metals, agricultural runoff, industrial effluents, oil and grease, food processing wastewater, a heavy metal solution, landfill leachate, textile wastewater, mining effluents, household wastewater, and pharmaceutical contaminants. Many waste streams may be applicable to use as a component in the aqueous solution in this method, depending on the properties of the and contaminants in the waste stream. This process could also be used in line with other decontamination/purification techniques, such as being used to purify a purification system's effluent or feeding the collected filtrate of this method into another water purification technique.

The aqueous solution comprises one or more contaminants. The one or more contaminants in the aqueous solutions may include heavy metals (e.g., lead, mercury, arsenic), pesticides, herbicides, nitrates, phosphates, pharmaceuticals (e.g., antibiotics, painkillers, hormones), solvents, oils, bacteria (e.g., *E. coli*), viruses, parasites, plastics, detergents, cyanide, sulfuric acid, and sediment. In some embodiments, the contaminant is a pharmaceutical contaminant. Suitable examples may include, but are not limited to, CTTC, oxytetracycline (OTC), sulfadiazine, ciprofloxacin, erythromycin, streptomycin, amoxicillin, tylosin, penicillin g, doxycycline, ceftriaxone, cefuroxime, chloramphenicol, levofloxacin, trimethoprim, sulfamethoxazole, clarithromycin, moxifloxacin, norfloxacin, lincomycin, tetracycline, rifampicin, ofloxacin, gentamicin, enrofloxacin, ceftazidime, azithromycin, vancomycin, clindamycin, florfenicol, ceftiofur, tiamulin, quinolones, ampicillin, bacitracin, metronidazole, rifaximin, furazolidone, colistin, polymyxin b, fucidic acid, cephalexin, cloxacillin, methylene blue, tigecycline, cefotaxime, nafcillin, ticarcillin, telithromycin, spectinomycin, fusidic acid, norfloxacin, neomycin, erythromycin ethylsuccinate, quinupristin, dalfopristin, linezolid, amikacin, imipenem, meropenem, doripenem, piperacillin, trimethoprim-sulfamethoxazole, pristinamycin, teicoplanin, cefdinir, cefepime, minocycline, carbapenems, gentamicin sulfate, clindamycin phosphate, nitroxoline, methicillin, caspofungin, polymyxin e, teicoplanin, amoxicillin-clavulanate, oxacillin, rifabutin, trimethoprim-sulfamethoxazole, nalidixic acid, furaltadone, levamisole, erythromycin lactobionate, vancomycin hydrochloride, roxithromycin, oxolinic acid, paromomycin, clarithromycin, oxytetracycline HCl, amikacin sulfate, cefoperazone, flumequine, amphenicols, leucomycin, sulfaquinoxaline, sulfamethazine, carbenicillin, aztreonam, ceftobiprole, ceftaroline, furazolidone, ampicillin-sulbactam, piperacillin-tazobactam, temocillin, mupirocin, colistimethate sodium, moxalactam, ropivacaine, lincosamide, linezolid, ticarcillin-clavulanate, lefamulin, bacitracin zinc, isavuconazonium sulfate, cefpodoxime, fosfomycin, chlortetracycline hydrochloride, penicillin v potassium, chloramphenicol sodium succinate, ampicillin trihydrate, ticarcillin sodium, erythromycin stearate, thiamphenicol, trimetoprim-sulfamethoxazole, cefoxitin, cefixime, cefoperazone sodium, nifuroxazide, paromomycin sulfate, daptomycin, fusafungine, monensin, balofloxacin, meticillan, nystatin, nitrofural, trimethoprim, oxytetracycline acetate, ceftazidime-avibactam, albendazole, clarithromycin phosphate, piperacillin/tazobactam, teicoplanin sodium, fidaxomicin, lefamulin acetate, liraglutide, tigecycline, chloroquine, sparfloxacin, valnemulin, trimethoprim, gentamicin sulfate, doxycycline hyclate, mupirocin ointment, cefpiramide, cloxacillin sodium, imipenem-cilastatin, monobactams, azithromycin, methylthioninium chloride, chlorhexidine, amikacin sulfate, ceftriaxone sodium, benzylpenicillin, ceftazidime, moxifloxacin hydrochloride, phenoxymethylpenicillin, rifapentine, chloromycetin, rifabutin, penicillin v, lomefloxacin, oxytetracycline hcl, nelfinavir, acetylspiramycin, amoxicillin trihydrate, ticarcillin, polymyxin e sulfate, amphotericin b, nystatin, cephalothin sodium, gentamicin sulfate, betamethasone, chloramphenicol succinate, pivmecillinam, nalidixic acid, hydroxychloroquine, amoxicillin/clavulanate potassium, furosemide, temocillin, benzylpenicillin, ceftizoxime, cefdinir, daptomycin sodium, methicillin sodium, thiamphenicol, cephradine, ceftobiprole, rifamycin, rifampin, mupirocin, streptogramins, fidaxomicin, sulfasalazine, cefepime, penicillin g, imidazole, cefotaxime sodium, rifaximin, nitrofurantoin, sulfadoxine, nitisinone, neomycin sulfate, doxycycline monohydrate, piperacillin, tazobactam, isoniazid, capreomycin, cephalexin, and trimethoprim-sulfamethoxazole. In a preferred embodiment, the contaminant is CTTC. CTTC may be representative of the behavior of similar pharmaceutical contaminants when present as a contaminant in the method.

In one or more embodiments, the total concentration of contaminants in the aqueous solution is less than or equal to 600 mg/L, preferably less than less than or equal to 400 mg/L, more preferably less or equal to 200 mg/L. In a specific embodiment the total concentration of contaminants in the aqueous solution is about 100 mg/L.

The pH of the aqueous solution plays a role in the adsorption process, influencing both the contaminant's ionization state and the surface charge of the nanocomposite material. Many contaminants are ionizable compounds, and their molecular form can change with varying pH levels. At different pH values, the degree of ionization affects the contaminant's solubility and the extent to which it can adsorb onto the nanocomposite material's surface.

In some embodiments, the pH of the aqueous solution may be maintained within specific ranges, including 6 to 8, 2 to 5, and 9 to 11. The desired pH levels can be achieved through the careful addition of acids and bases. In particular, the acids utilized may include hydrochloric acid (HCl), sulfuric acid ($H_2SO_4$), nitric acid ($HNO_3$), acetic acid ($CH_3COOH$), and phosphoric acid ($H_3PO_4$). Conversely, the bases employed for pH adjustment may consist of sodium hydroxide (NaOH), potassium hydroxide (KOH), ammonium hydroxide ($NH_4OH$), sodium bicarbonate ($NaHCO_3$), and lithium hydroxide (LiOH). Other acids or bases may be used, or the pH level of the aqueous solution may be appropriate and not require adjustment. The concentrations of these acids and bases used in the experiments can range from 0.1 M, 1.0 M, 2.0 M, 3.0 M, 0.5 M, 0.25 M, allowing for precise control over the pH of the aqueous solution to optimize conditions for water decontamination processes. In a preferred embodiment, the pH of the aqueous solution is about 6-7.

The temperature of the aqueous solution affects the adsorption process by influencing the kinetics and thermodynamics of contaminant's interactions with the nanocomposite material. Increased temperature raises the kinetic energy of contaminant molecules, enhancing diffusion rates and mobility, which facilitates their transfer to the nanocomposite material surface, often resulting in improved adsorption capacities and faster uptake rates. Higher temperatures can also strengthen interactions between the contaminant and the nanocomposite material. However, excessively high temperatures may cause desorption or degradation of either the contaminant or the nanocomposite material, reducing adsorption efficiency. In some embodiments, the temperature of aqueous solution may range from 20 to 40° C., 25 to 40° C., 30 to 40° C., 35 to 40° C. In a preferred embodiment, the temperature of the aqueous solution is about 25° C.

In one or more embodiments, the amount of $MoO_3$@$Al_2O_3$—MgO nanocomposite material used in the method is in a range from 200 to 600 mg of $MoO_3$@$Al_2O_3$—MgO nanocomposite material per liter of aqueous solution, preferably 350 to 500 mg of $MoO_3$@ $Al_2O_3$—MgO nanocomposite material per liter of aqueous solution, more preferably 375 to 450 mg of $MoO_3$@$Al_2O_3$—MgO nanocomposite material per liter of aqueous solution.

At step 54, the method 50 includes mixing the reaction mixture. In some embodiments, the mixing can be done by stirring, swirling, sonicating, or a combination thereof may be employed to form the resultant mixture. The reaction mixture is mixed to achieve homogeneity and to facilitate effective interactions among the various constituents. Mixing enhances the dispersion of the nanocomposite within the aqueous solution, allowing for optimal contact between the nanocomposite and the contaminant. In some embodiments, the reaction mixture is mixed for 60 minutes, 70 minutes, 80 minutes, preferably about 90 minutes.

At step 56, the method 50 includes collecting a filtrate. In some embodiments, the filtration can be conducted using various techniques, such as gravity filtration, membrane filtration, pressure filtration, suction filtration, and vacuum filtration, depending on the particle size of the nanocomposite. The filtrate has fewer of the one or more contaminants than the aqueous solution. The change in contaminant concentration between the aqueous solution with an initial contaminant concentration and the filtrate with a reduced contaminant concentration may be evaluated through any applicable method, such as UV-Vis absorption analysis, gravimetric analysis, spectrographic analysis, or any other typical or applicable method.

The adsorption capacity of the $MoO_3$@ $Al_2O_3$—MgO nanocomposite material for chlortetracycline is greater than or equal to 90 mg/g, preferably greater than 95 mg/g, preferably greater than 100 mg/g, preferably greater than 105 mg/g, preferably greater than 110 mg/g, preferably greater than 115 mg/g, preferably greater than 120 mg/g, preferably greater than 130 mg/g, preferably greater than 135 mg/g, preferably greater than 140 mg/g, preferably greater than 145 mg/g, preferably greater than 150 mg/g. In a specific embodiment, the $MoO_3$ nanocomposite material has the adsorption capacity for chlortetracycline of 125.9 mg/g. In another specific embodiment, the $MoO_3$ nanocomposite material has the adsorption capacity for chlortetracycline of 150.1 mg/g.

The $MoO_3$@$Al_2O_3$—MgO nanocomposite material is reusable after a undergoing a regeneration cycle. In this step, the $MoO_3$@$Al_2O_3$—MgO nanocomposite material can be regenerated by using ethanol. In some embodiments, the CTTC removal efficiency of the regenerated $MoO_3$@$Al_2O_3$—MgO nanocomposite material is greater than or equal to 50%, 60%, 70%, 80% after 4 regeneration cycles.

Figure 1B:
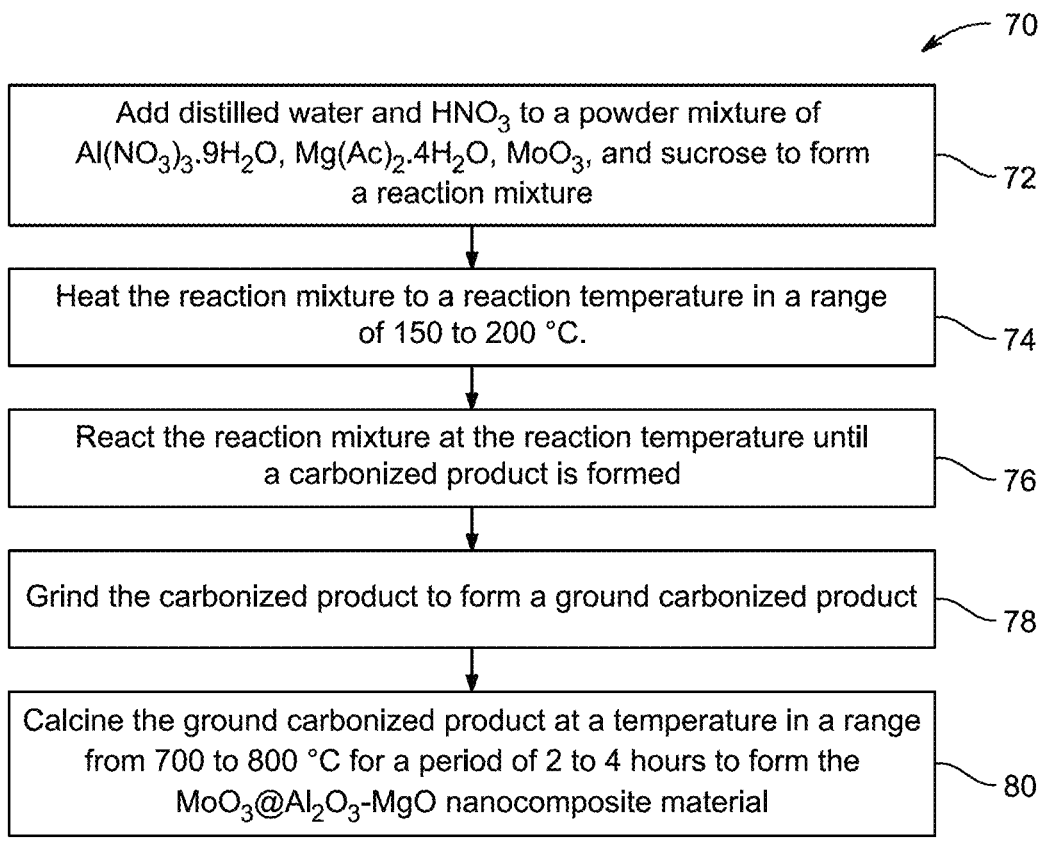
FIG. 1B is a flow chart depicting a method for synthesizing a MoO$_3$@Al$_2$O$_3$—MgO nanocomposite material, according to certain embodiments.

FIG. 1B illustrates a flow chart of a method 70 for synthesizing a $MoO_3$@$Al_2O_3$—MgO nanocomposite material. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes adding distilled water and $HNO_3$ to a powder mixture of $Al(NO_3)_3 \cdot 9H_2O$, $Mg(Ac)_2 \cdot 4H_2O$, $MoO_3$, and sucrose to form a reaction mixture.

The $Al(NO_3)_3 \cdot 9H_2O$ provides the $Al^{3+}$ ions needed to form $Al_2O_3$, the $Mg(Ac)_2 \cdot 4H_2O$ supplies the $Mg^{2+}$ ions, and the MoO$_3$ provides the molybdenum oxide particles that will be dispersed in the Al$_2$O$_3$—MgO matrix. The sucrose acts as a carbon source and may aid in creating a porous structure. In some embodiments, glucose, citric acid, glycerol, tannic acid, polyvinyl alcohol (PVA), humic acid may also be used in place of sucrose to serve as the carbon source.

Nitric acid is generally used to facilitate the dissolution of the powder mixture in water and helps in forming the reaction mixture; although other acids like hydrochloric acid (HCl), sulfuric acid (H$_2$SO$_4$), perchloric acid (HClO$_4$), boric acid (H$_3$BO$_3$), phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid, carbonic acid can be used as well.

At step 74, the method 70 includes heating the reaction mixture to a reaction temperature in a range of 150 to 200° C. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. The heating is varied out till all the water is evaporated, and causes degradation of the carbon source, preferably sucrose.

At step 76, the method 70 includes reacting the reaction mixture at the reaction temperature until a carbonized product is formed. The reaction temperature is maintained till degradation of the sugar or other carbon source to carbon, which is the formation of the carbonized product.

At step 78, the method 70 includes grinding the carbonized product to form a ground carbonized product. The grinding may be carried out using any suitable means, for example, ball milling, blending, etc., using manual method (e.g., mortar) or machine-assisted methods such as using a mechanical blender, or any other apparatus known to those of ordinary skill in the art. In a preferred embodiment, the carbonized product is ground in a mortar.

At step 80, the method 70 includes calcining the ground carbonized product at a temperature in a range from 700 to 800° C., more preferably 720 to 820° C., and yet more preferably 750° C. for a period of 2 to 4 hours, 2.5 to 3.5 hours, and yet more preferably 3 hours to form the MoO$_3$@Al$_2$O$_3$—MgO nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min. During calcination, any carbon source material left further decomposes, leaving behind a porous structure, and the metal salts convert to oxides, forming the MoO$_3$@Al$_2$O$_3$—MgO nanocomposite material. The properties of the MoO$_3$@Al$_2$O$_3$—MgO nanocomposite material produced are the same as those described above.

EXAMPLES

The following examples demonstrate a method of water decontamination. The examples are provided solely for illustration and are not to be construed as limitations of the present disclosure, as many variations thereof are possible without departing from the spirit and scope of the present disclosure.

Example 1: Materials

Magnesium acetate tetrahydrate (Mg(Ac)$_2$·4H$_2$O), molybdenum oxide (MoO$_3$), and chlortetracycline (CTTC) were sourced from Fluka, Switzerland. Aluminum nitrate nonahydrate (Al(NO$_3$)$_3$·9H$_2$O) were sourced from Redel De-Haene, and nitric acid (72%, HNO$_3$) was provided by Sharlau, Spain. Commercial food-grade white cane sucrose was sourced locally.

Example 2: Synthesis Method

According to the present disclosure, about 10.0 grams (g) of sucrose, 17.46 g of Al(NO$_3$)$_3$·9H$_2$O, and 25.41 g of Mg(Ac)$_2$·4H$_2$O were transferred to a 500-millimeter (mL) beaker. Further, 50 mL of distilled water (DW) and 5 mL of HNO$_3$ were added to the powder mixture and heated to 100° C. until a clear yellowish color solution formed. The temperature was raised to about 150° C. to 200° C. and maintained until sucrose carbonization occurred. The resulting black product was ground in a mortar, calcined at 750° C. for 3.0 h, and then Al$_2$O$_3$—MgO nanocomposite (0-MoO$_3$) was collected. The 5% MoO$_3$@Al$_2$O$_3$—MgO (5-MoO$_3$) and 10% MoO$_3$@Al$_2$O$_3$—MgO (10-MoO$_3$) triple nanocomposites were fabricated similarly, with the addition of the appropriate quantity of MoO$_3$ to achieve the desired percentages.

Example 3: Characterization of the Nanocomposites

The morphologies of 0-MoO$_3$, 5-MoO$_3$, and 10-MoO$_3$ nanocomposites were analyzed using field emission scanning electron microscopy with energy-dispersive X-ray spectroscopy (FESEM-EDX), JSM-IT500HR, JEOL, and transmission electron microscopy (TEM) (JEM-1400, JEOL. The porosity and surface characteristics of the 0-MoO$_3$, 5-MoO$_3$, and 10-MoO$_3$ nanocomposites were examined via a surface analyser, ASAP-2020, Micromeritics. The X-ray diffractometer (XRD), Bruker was used to inspect the crystallinity of the 0-MoO$_3$, 5-MoO$_3$, and 10-MoO$_3$ nanocomposites. The average crystal size (D) was estimated using equation (1) of the Scherrer equation. Lattice parameters (a, c) were calculated using Equation (2) and Equation (3), whereas the lattice imperfection (ε) was computed using Equation (4). [See: Breland, O.P.J.S., McGraw-Hill book company, and Mote, V., and coworkers, *Williamson-hall analysis in estimation of lattice strain in nanometre-sized ZnO particles* which is incorporated herein by reference in its entirety]

$$D = \frac{0.9\lambda}{\beta\cos\theta} \tag{1}$$

$$a = \frac{\lambda}{\sqrt{3}\cos\theta} \tag{2}$$

$$c = \frac{\lambda}{\sin\theta} \tag{3}$$

$$\varepsilon = \frac{\beta}{4\cos\theta} \tag{4}$$

Where 'θ' and 'β' are Bragg's angle and the peak width at half-maximum, 'Δ' is the source-wavelength-line, and Cu-Kα-1.5406 Å [See: Ilyas, S. and coworkers, *X-ray diffraction analysis of nanocomposite Fe₃OW/activated carbon by Williamson-hall and size-strain plot methods* which is incorporated herein by reference in its entirety].

A batch methodology was employed to evaluate chlorotetracycline (CTTC) dye adsorption onto 0-MoO₃, 5-MoO₃, and 10-MoO₃ nanocomposites. A 120 mL CTTC solution (100 mg L$^{-1}$) was stirred constantly with 50 mg of each sorbent. Further, samples were taken from each beaker, filtered, and analyzed to determine CTTC concentrations using a visible ultraviolet (UV-vis) spectrophotometer. The adsorption capacity of CTTC onto sorbent at any time (t) and at equilibrium ($q_t$ and $q_e$, mg g$^{-1}$) was calculated using equation (5).

$$Qt = v(C_0 - C_t)/m \quad (5)$$

where v (liters) is the volume of the solution, '$C_0$' and '$C_t$' (mg L$^{-1}$) are the initial and final concentrations of CTTC, and 'm' (grams) is the adsorbent mass. To identify the optimal sorbent for adsorbing CTTC, data was analyzed based on the contact time required to reach equilibrium. CTTC kinetics were studied using the pseudo-first-order model (PSFOM) in equation (6), pseudo-second-order models (PSSOM) in equation (7), liquid-film diffusion model (LFDM) in equation (8), and intraparticle diffusion models (IPDM) in equation (9).

$$\ln(q_e - q_t) = \ln q_e - k_1 \cdot t \quad (6)$$

$$\frac{1}{q_t} = \frac{1}{k_2 \cdot q_e^2 t} + \frac{1}{q_e} \quad (7)$$

$$\ln(1 - F) = -K_{LF} * t \quad (8)$$

$$q_t = K_{IP} * t^{\frac{1}{2}} + C_i \quad (9)$$

Here, '$k_1$' (min$^{-1}$), $k_2$ (g mg$^{-1}$ min$^{-1}$), '$K_{ip}$' (mg g$^{-1}$ min$^{0.5}$), and '$K_{1x}$' (min$^{-1}$) represent the PSFOM, PSSOM, LFDM, and IPDM constants, respectively, while '$C_i$' (mg g$^{-1}$) indicates the boundary-layer-thickness factor.

Figure 2A:
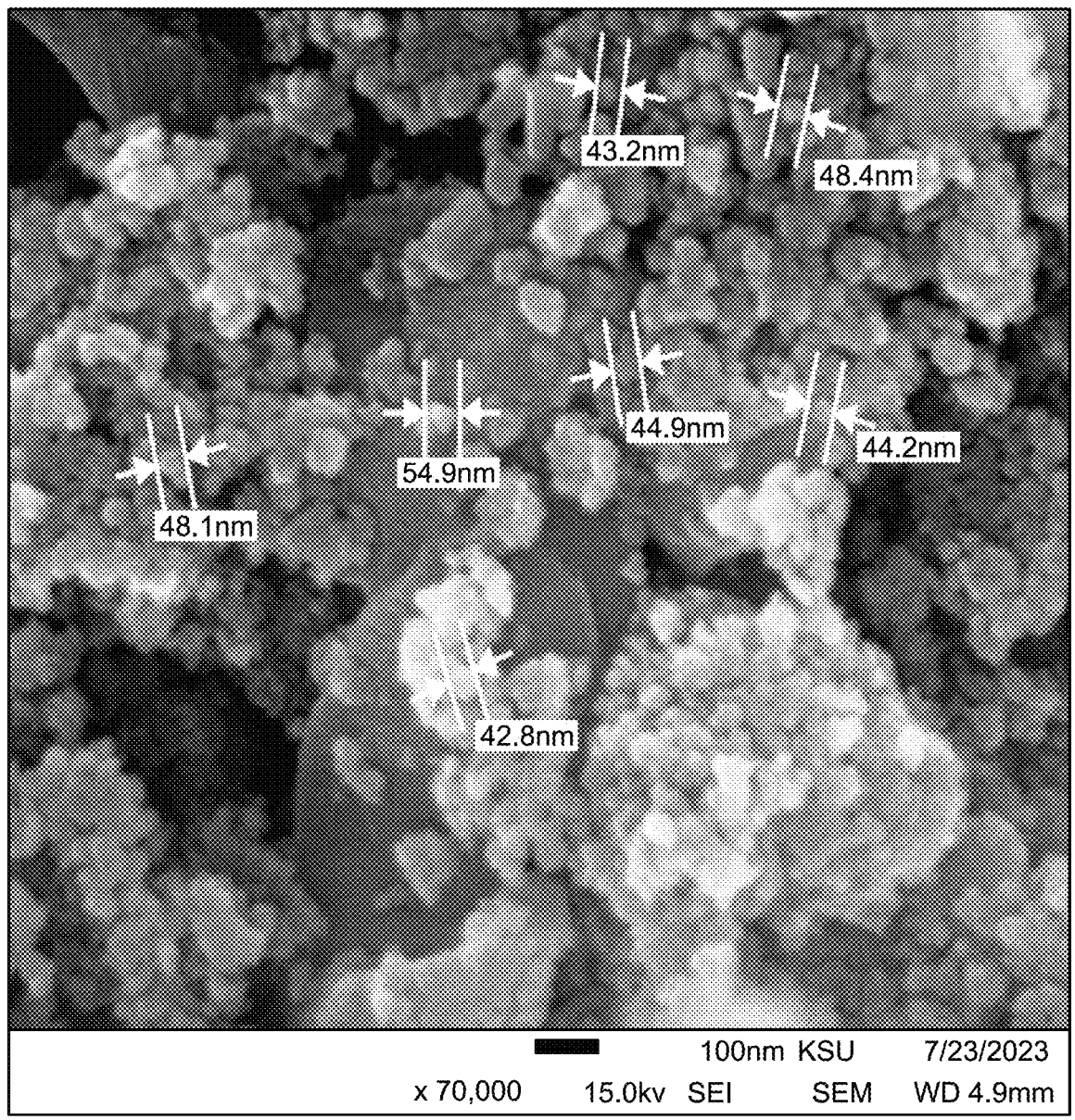
FIG. 2A shows a scanning electron microscopy (SEM) image of 0-MoO$_3$ nanocomposite, according to certain embodiments.
Figure 2B:
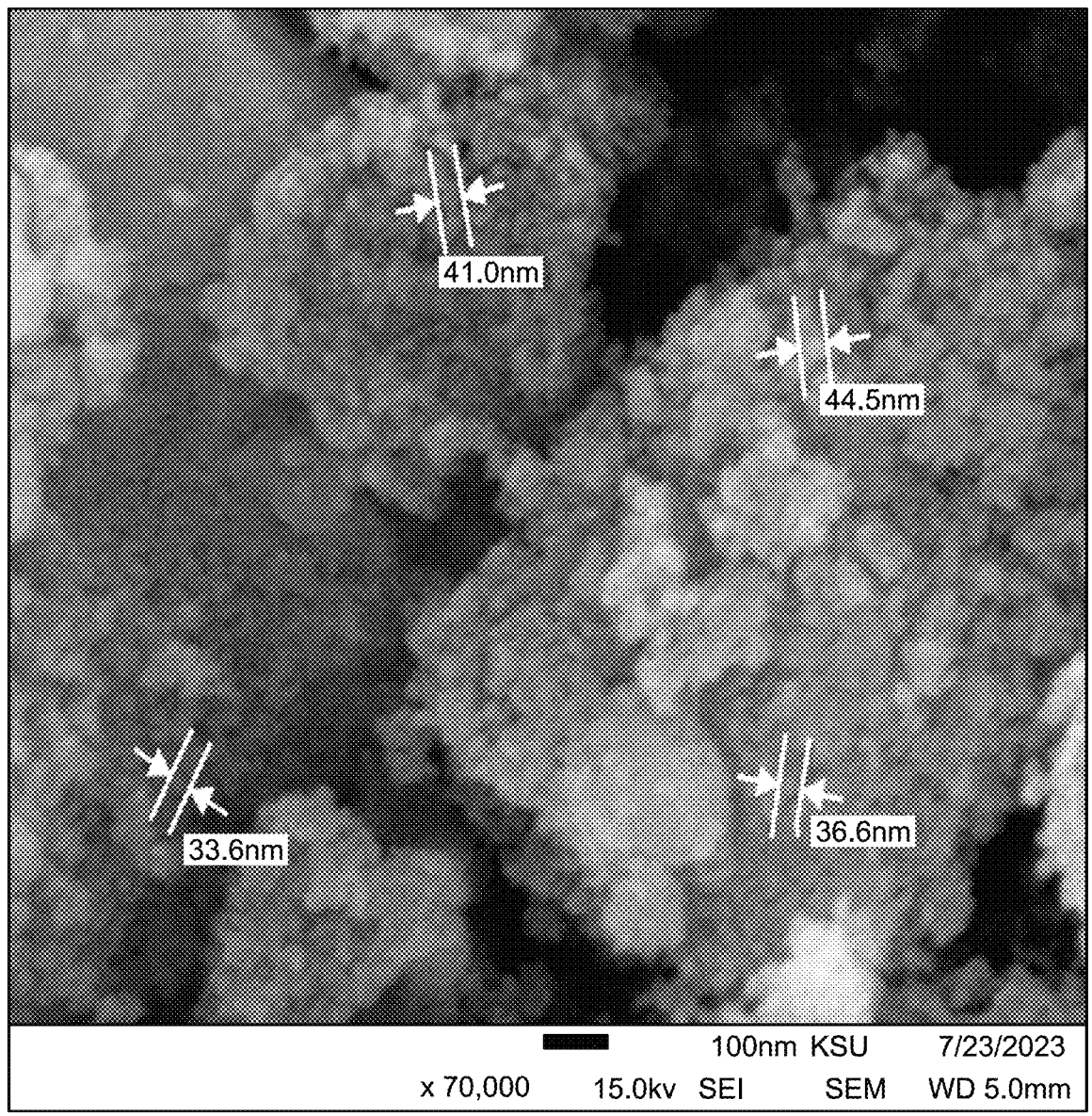
FIG. 2B shows a SEM image of 5-MoO$_3$ nanocomposite, according to certain embodiments.
Figure 2C:
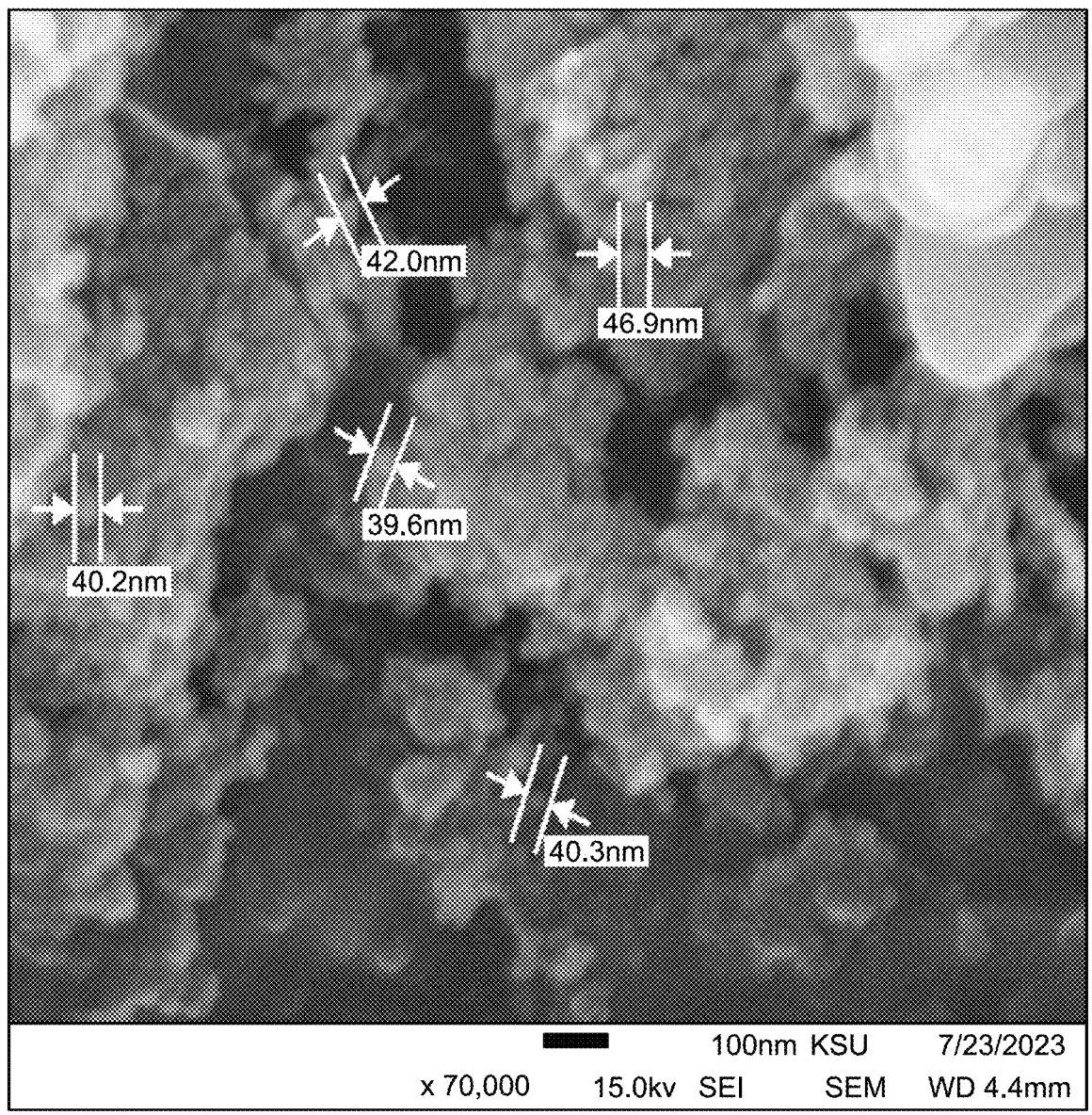
FIG. 2C shows a SEM image of 10-MoO$_3$ nanocomposite, according to certain embodiments.
Figure 3A:
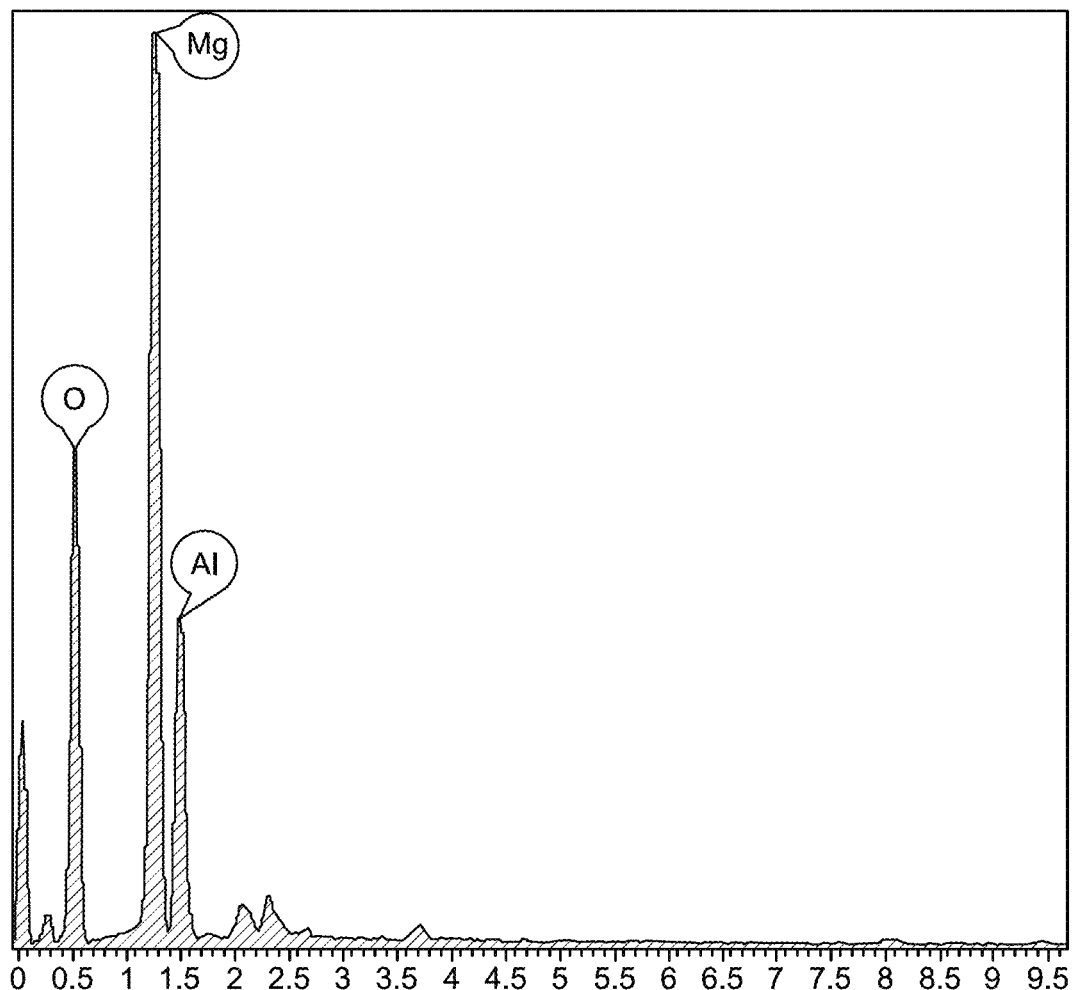
FIG. 3A is a graph depicting energy-dispersive X-ray (EDX) spectroscopy analysis results for the 0-MoO$_3$ nanocomposite, according to certain embodiments.
Figure 3B:
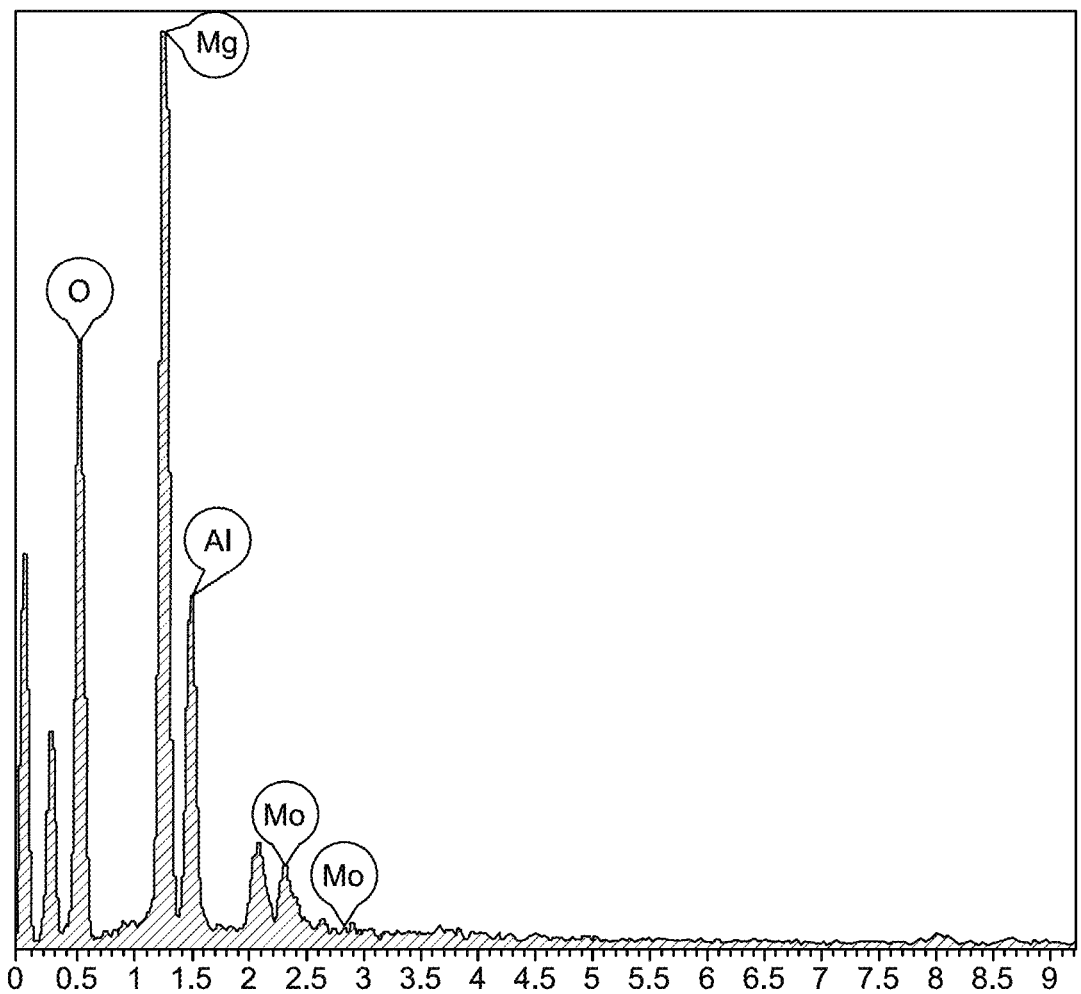
FIG. 3B is a graph depicting EDX analysis results for the 5-MoO$_3$ nanocomposite, according to certain embodiments.
Figure 3C:
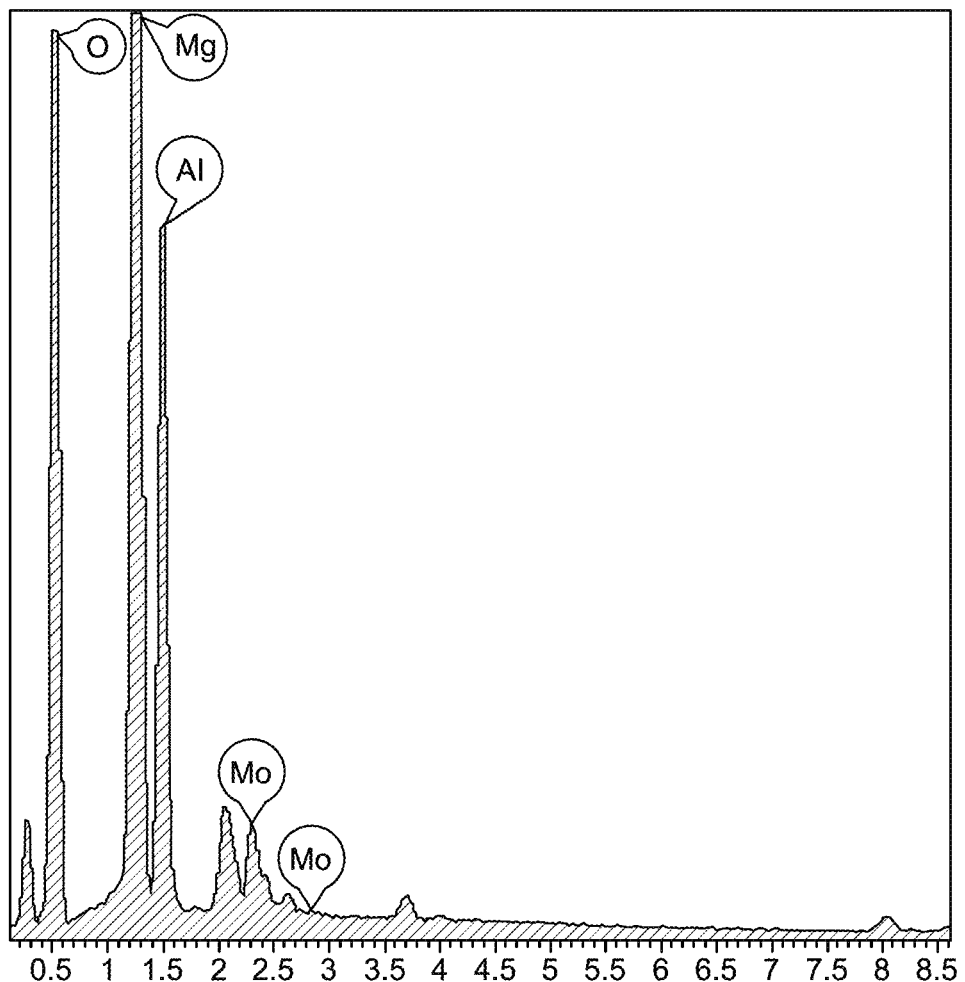
FIG. 3C is a graph depicting EDX analysis results for the 10-MoO$_3$ nanocomposite, according to certain embodiments.

SEM was utilized to examine the surface morphology of the synthesized 0-MoO₃, 5-MoO₃, and 10-MoO₃ nanocomposites, as shown in FIGS. 2A-2C. The particles of the three nanocomposites were within the nanoscale, with some agglomerations and/or clusters in 0-MoO₃ and 10-MoO₃. The 0-MoO₃, 5-MoO₃, and 10-MoO₃ nanocomposites showed particle size ranges between 42.8 nm to 54.9 nm, 33.6 nm to 44.5 nm, and 39.3 nm to 44.9 nm, respectively, with a fluffy appearance for the 5-MoO₃ nanocomposite. Further, EDX analysis was conducted to evaluate the elemental composition of the 0-MoO₃, 5-MoO₃, and 10-MoO₃ nanocomposites, and the resulting spectra are depicted in FIGS. 3A-3C. Apart from the two peaks between 0.0 and 0.6 kilo electron volt (keV) that may be attributed to the sample holder, the three nanocomposites showed spectra indicative of desirable purity.

Figure 4:
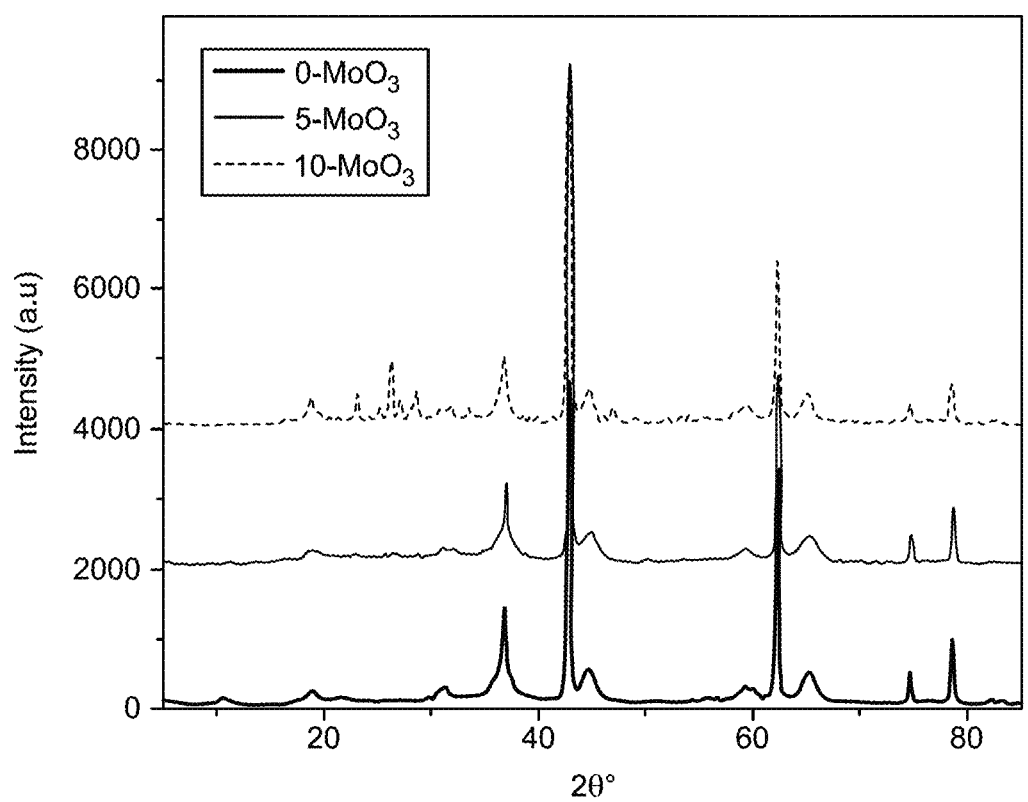
FIG. 4 shows X-ray diffraction (XRD) patterns for the 0-MoO$_3$, 5-MoO$_3$, and 10-MoO$_3$ nanocomposites, according to certain embodiments.

The crystallinity and phase purity of the 0-MoO₃, 5-MoO₃, and 10-MoO₃ nanocomposites were analyzed using XRD powder spectrophotometry. FIG. 4 illustrates the resulting XRD patterns of 0-MoO₃, 5-MoO₃, and 10-MoO₃. The appearance of additional phases with the 10-MoO₃ nanocomposite may be attributed to the MoO₃. Peaks from the XRD analysis were utilized to calculate the crystal parameters of the composites, as listed in Table 1. The XRD demonstrated that the 5-MoO₃ nanocomposite exhibited the narrowest D range of 0.36 nm to 18.67 nm and the smallest crystal and average size of 0.36 nm and 7.42 nm, respectively, which aligned with the SEM findings.

TABLE 1

XRD crystal size results of the as-synthesized 0-MoO₃, 5-MoO₃, and 10-MoO₃ nanocomposites.

| 0-MoO₃ 2θ° | D | 5-MoO₃ 2θ° | D | 10-MoO₃ 2θ° | D |
|---|---|---|---|---|---|
| 19.60 | 2.05 | 19.23 | 2.69 | 18.87 | 6.29 |
| 35.49 | 0.69 | 33.03 | 0.36 | 23.13 | 20.52 |
| 36.82 | 8.95 | 36.95 | 7.19 | 26.29 | 2.63 |
| 42.83 | 22.65 | 42.99 | 5.65 | 26.29 | 23.80 |
| 44.48 | 2.77 | 44.40 | 2.58 | 28.66 | 19.45 |
| 61.05 | 0.80 | 61.27 | 0.68 | 31.39 | 6.55 |
| 62.24 | 18.81 | 62.38 | 18.67 | 32.94 | 0.37 |
| 65.24 | 4.70 | 65.28 | 3.80 | 36.75 | 7.90 |
| 74.63 | 14.55 | 74.77 | 14.62 | 42.84 | 20.50 |
| 78.58 | 14.00 | 78.70 | 13.71 | 44.33 | 2.53 |
|  |  |  |  | 60.67 | 0.63 |
|  |  |  |  | 62.25 | 17.06 |
|  |  |  |  | 65.06 | 5.57 |
|  |  |  |  | 74.65 | 11.12 |
|  |  |  |  | 78.60 | 12.47 |
| Minimum | 0.69 |  | 0.36 |  | 0.37 |
| Maximum | 22.65 |  | 18.67 |  | 23.80 |
| Average | 9.44 |  | 7.42 |  | 10.68 |

Figure 5A:
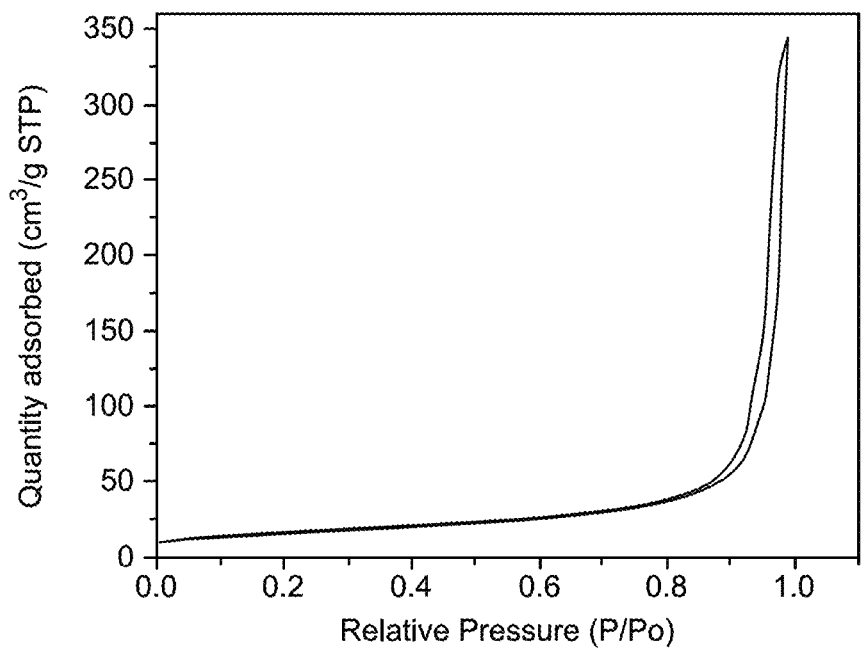
FIG. 5A shows an N$_2$ adsorption-desorption isotherm for the 0-MoO$_3$ nanocomposite, according to certain embodiments.
Figure 5B:
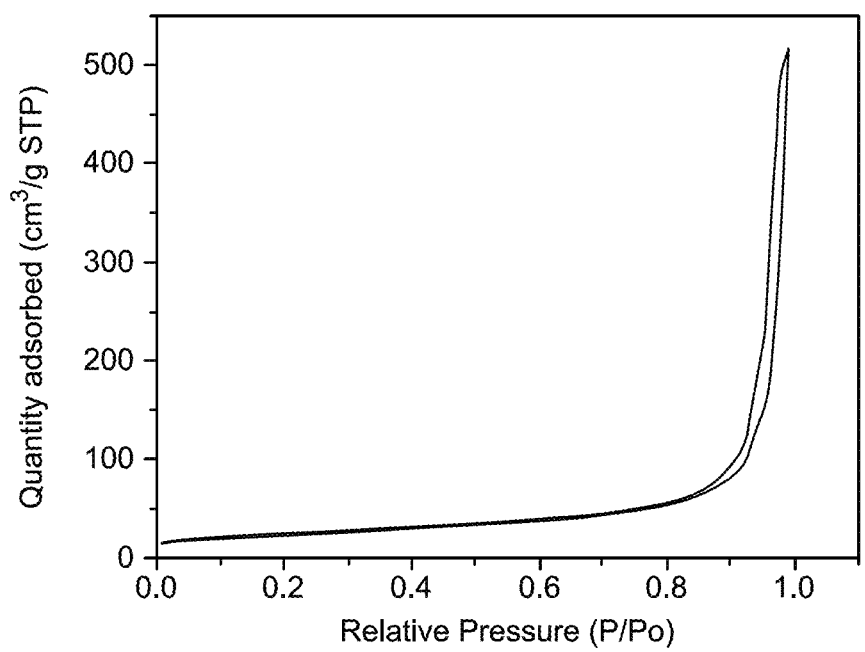
FIG. 5B shows an N$_2$ adsorption-desorption isotherm for the 5-MoO$_3$ nanocomposite, according to certain embodiments.
Figure 5C:
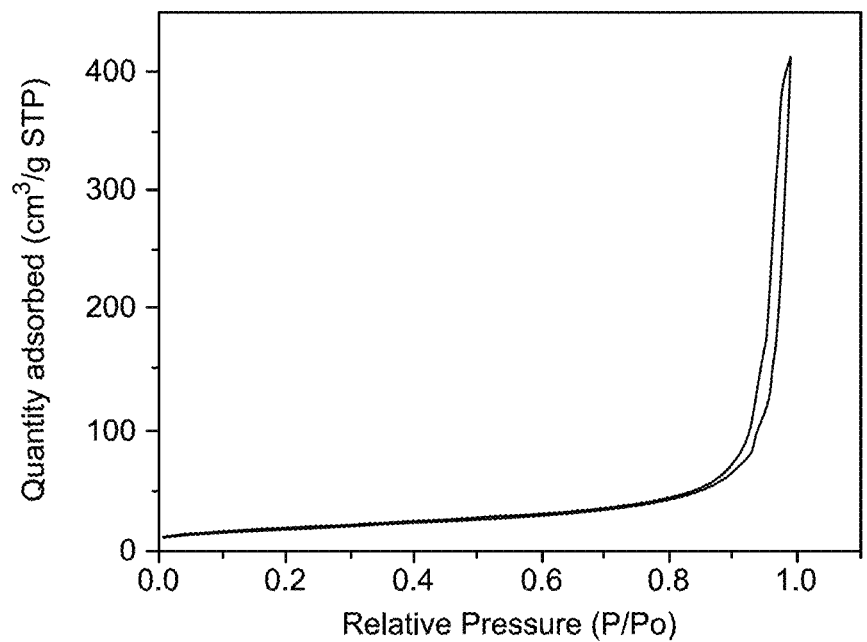
FIG. 5C shows an N$_2$ adsorption-desorption isotherm for the 10-MoO$_3$ nanocomposite, according to certain embodiments.

The N₂ adsorption-desorption isotherm was employed to examine the characteristics of 0-MoO₃, 5-MoO₃, and 10-MoO₃ nanocomposites, including specific pore volume (SPV), surface area (SA), and average pore diameter (APD) as listed in Table 2. N₂ isotherm curves were determined by quantifying gas adsorbed at increasing relative pressure. Conversely, measuring gas evacuated from the sample gives the desorbed isotherm as relative pressure decreases. FIGS. 5A-5C show the produced hysteresis loops of 0-MoO₃, 5-MoO₃, and 10-MoO₃ nanocomposites. The three nanocomposites exhibited H₃ hysteresis loops associated with aggregated crystals with slit-like micro-mesoporous structures.

TABLE 2

The surface characteristics of 0-MoO₃, 5-MoO₃, and 10-MoO₃ nanocomposites.

| Sorbent | SA (m²/g) | PD (Å) | PV (cm³ g$^{-1}$) |
|---|---|---|---|
| 0-MoO₃ | 56.766 | 7.268 | 0.261 |
| 5-MoO₃ | 112.786 | 11.45 | 0.457 |
| 10-MoO₃ | 75.625 | 10.5 | 0.341 |

Figure 5D:
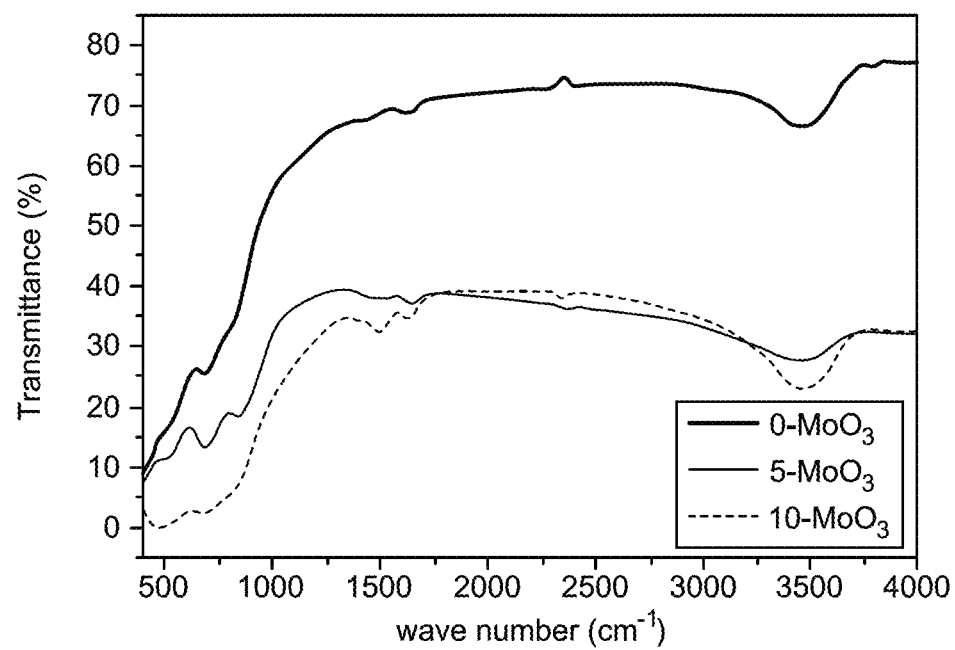
FIG. 5D is a Fourier transform infrared (FTIR) spectroscopy transmittance of the 0-MoO$_3$ nanocomposite, 5-MoO$_3$ nanocomposite, and 10-MoO$_3$ nanocomposite, according to certain embodiments.

The Fourier transform infrared (FTIR) analysis was utilized to characterize the 0-MoO₃, 5—MoO₃, and 10-MoO₃ nanocomposites shown in FIG. 5D. Vibrating bands in the 400 cm$^{-1}$ to 900 cm$^{-1}$ range correspond to the Al—O—Al, symmetric and asymmetric stretching vibrations, Mg—O, and Mo—O—Mo bonds [See: A. Afkhami, M. Saber-Tehrani, H. Bagheri, *Simultaneous removal of heavy-metal ions in wastewater samples using nano-alumina modified with 2, 4-dinitrophenylhydrazine*, R. Prabhakar, S. Samadder, *Low cost and easy synthesis of aluminium oxide nanoparticles for arsenite removal from groundwater*, and Y. Chen and coworkers, *Ultra-deep oxidative desulfurization of fuel with H₂O₂ catalysed by mesoporous silica-supported molybdenum oxide modified by Ce*]. The band at 3200 cm-1 corresponds to the O—H stretching vibrations of adsorbed water.

Figure 6A:
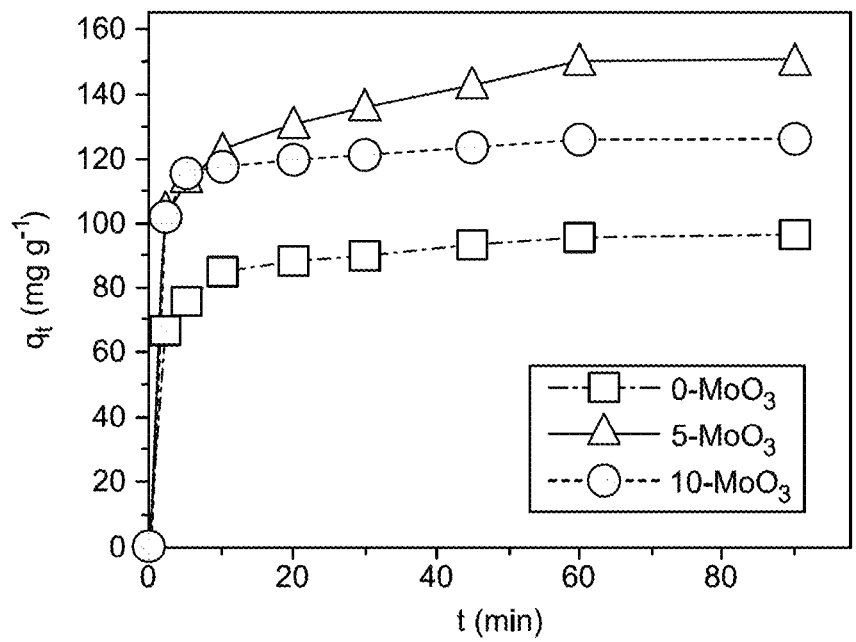
FIG. 6A is a graph of a contact time analysis for chlortetracycline (CTTC) adsorption onto the 0-MoO$_3$, 5-MoO$_3$, and 10-MoO$_3$ nanocomposites, according to certain embodiments.
Figure 6B:
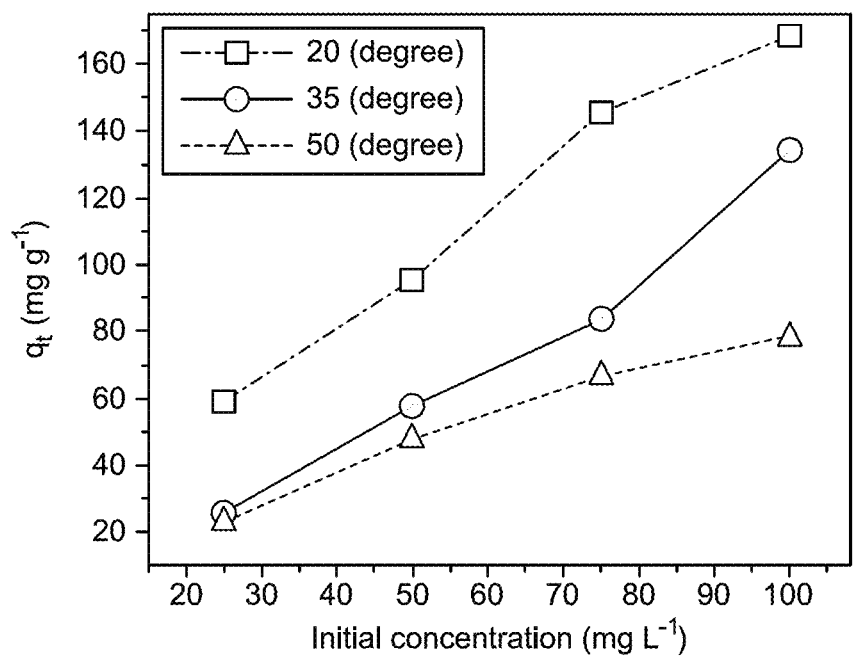
FIG. 6B shows a graph of the impact of CTTC concentration and temperature on its adsorption onto the 5-MoO$_3$ nanocomposite, according to certain embodiments.

FIG. 6A depicts the contact time analysis of CTTC sorption onto 0-MoO₃, 5-MoO₃, and 10-MoO₃ nanocomposites. The sorption on the three sorbents progressed rapidly and reached equilibrium within 60 minutes. The 0-MoO$_3$, 5-MoO$_3$, and 10-MoO$_3$ possessed 'q$_t$' values of 96.3 mg g$^{-1}$, 150.1 mg g$^{-1}$, and 125.9 mg g$^{-1}$, respectively. The results aligned with the 5-MoO$_3$ having the highest surface area and were comparable with literature findings, as listed in Table 3. It may be noted that about 80% of CTTC uptake occurred within the first 40 minutes, with increased performance for the 5-MoO$_3$ nanocomposites. In addition, the impact of CTTC-fed concentrations on sorption of the CTTC by 5-MoO$_3$ was examined. FIG. 6B showed that as the CTTC concentration increased to 100 mg L$^{-1}$, the 'q$_t$' value rose proportionally without exceeding equilibrium, which indicated that a 5:12 sorbent-to-solution ratio remained effective within the concentration range. The 5-MoO$_3$ performance at low and high concentrations implied the suitability of 5-MoO$_3$ for treating contaminated water and industrial effluents.

TABLE 3

Performance comparison of the as-synthesized 0-MoO$_3$, 5-MoO$_3$, and 10-MoO$_3$ with the sorbents known in the art, in removing CTTC from water.

| Sorbent | Pollutant | Qt (mg/g) | Reference |
|---|---|---|---|
| 0-MoO$_3$ | CTTC | 96.3 | Present disclosure |
| 5-MoO$_3$ | | 150.1 | Present disclosure |
| 10-MoO$_3$ | | 125.9 | Present disclosure |
| Lanthanum-modified zeolite (La-Z). | | 127.5 | 1* |
| Pinewood biochar | | 208.3 | 2* |
| Graphene oxide/ TiO$_2$ composite | | 261.1 | 3* |
| Chitin | | 12.01 | 4* |
| Rectories | | 177.7 | 5* |
| Biochar derived from cauliflower | | 81.3 | 6* |
| Biochar derived from corn cob and | | 16.96 | 7* |

1* R. Yu and coworkers, Adsorption of chlortetracycline from aquaculture wastewater using modified zeolites.
2* M. Taheran and coworkers, Adsorption study of environmentally relevant concentrations of chlortetracycline on pinewood biochar.
3* Z. Li and coworkers, Highly efficient removal of chlortetracycline from aqueous solution using graphene oxide/TiO$_2$ composit.
4* M.S. Tunç, "O. Hanay, B. Yıldız, Adsorption of chlortetracycline from aqueous solution by chitin.
5* L. Guocheng and coworkers, Adsorption of chlortetracycline from water by rectories.
6* T. Qin and coworkers, A novel biochar derived from cauliflower (*brassica oleracea* l.) roots could remove norfloxacin and chlortetracycline efficiently.
7* L. Zhang and coworkers, Adsorption of chlortetracycline onto biochar derived from corn cob and sugarcane bagasse.

Figure 6C:
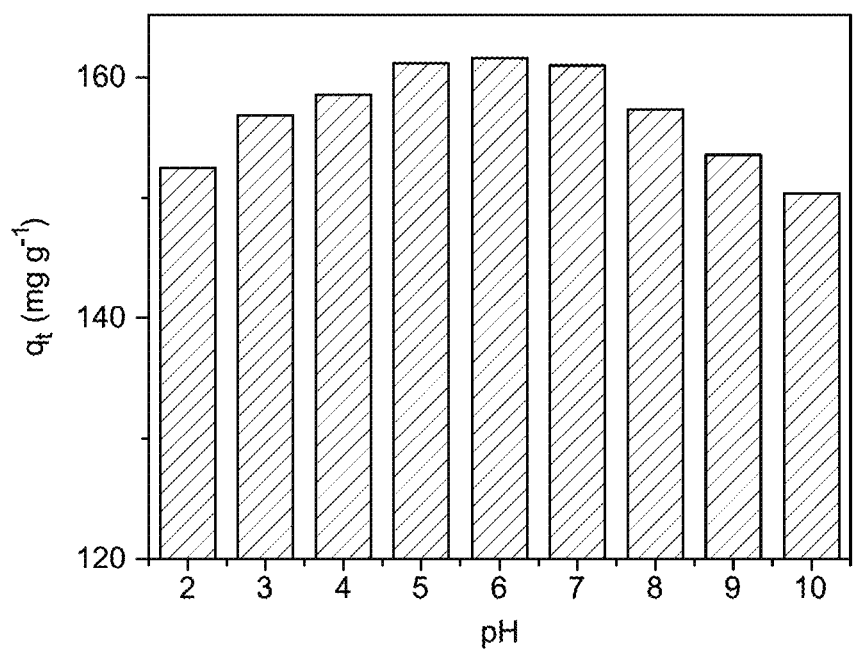
FIG. 6C is a graph depicting the influence of pH on CTTC removal by the 5-MoO$_3$ nanocomposite, according to certain embodiments.
Figure 6D:
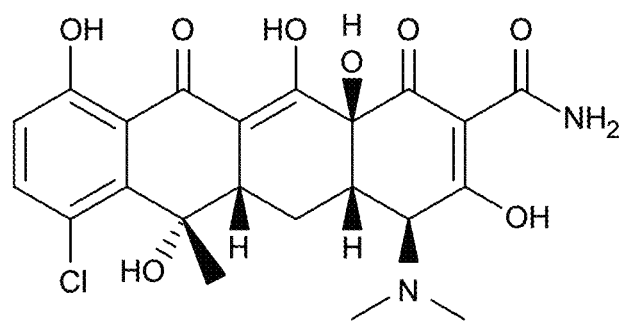
FIG. 6D is an exemplary chemical structure of CTTC, according to certain embodiments.
Figure 7A:
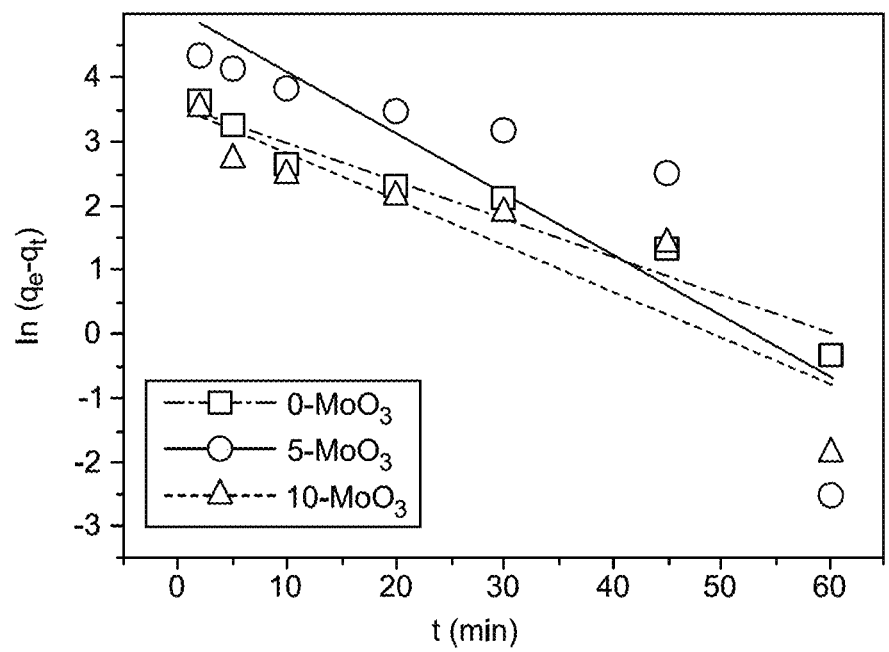
FIG. 7A is a graph depicting kinetic evaluations of CTTC adsorption onto the 0-MoO$_3$, 5-MoO$_3$, and 10-MoO$_3$ nanocomposite using the pseudo-first-order model (PSFO), according to certain embodiments.
Figure 7B:
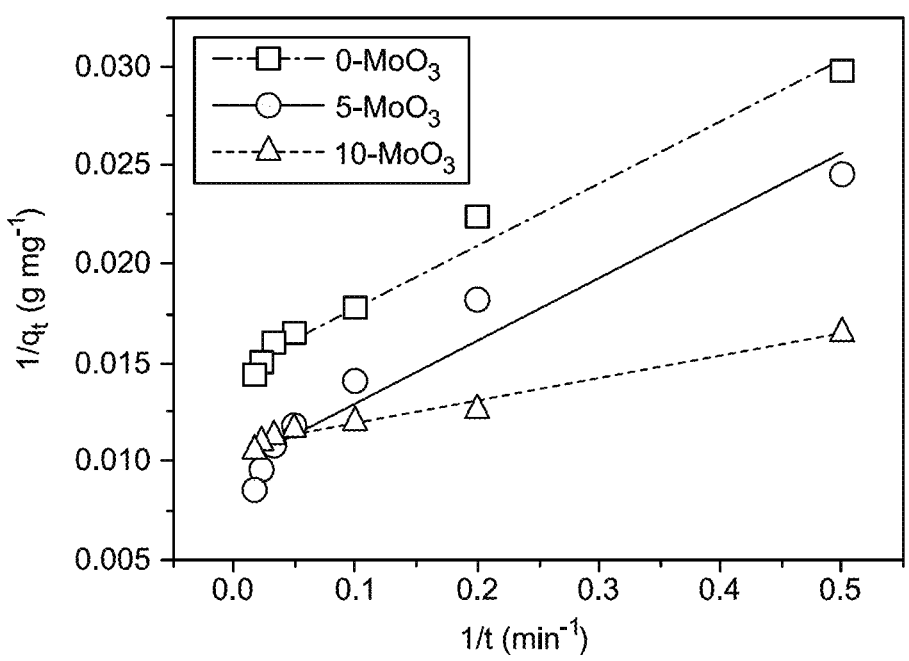
FIG. 7B is a graph depicting kinetic evaluations of CTTC adsorption onto the 0-MoO$_3$, 5-MoO$_3$, and 10-MoO$_3$ nanocomposite using the pseudo-second-order model (PSSO), according to certain embodiments.
Figure 7C:
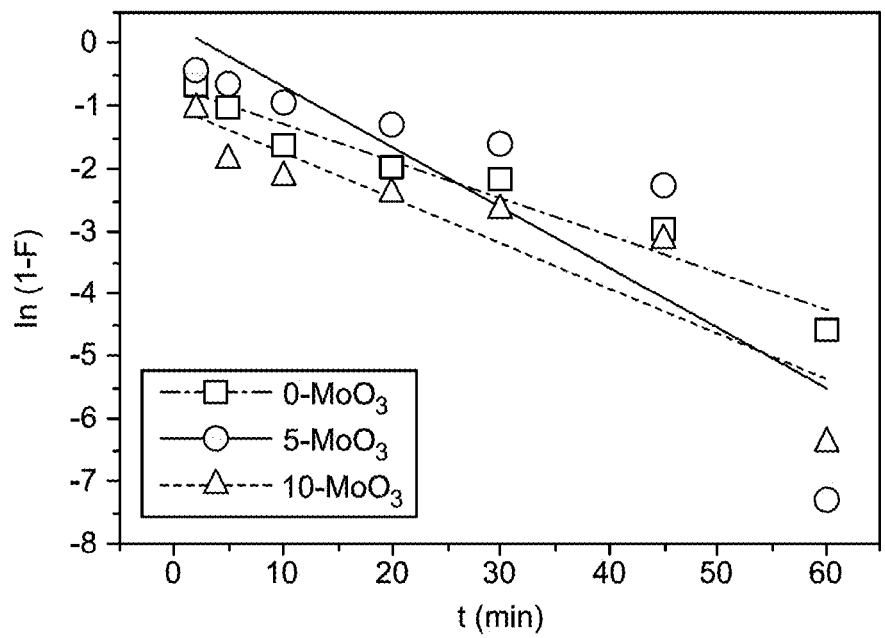
FIG. 7C is a graph depicting kinetic evaluations of CTTC adsorption onto the as-prepared 0-$MoO_3$, 5-$MoO_3$, and 10-$MoO_3$ nanocomposite using the liquid-film model (LDM), according to certain embodiments.
Figure 7D:
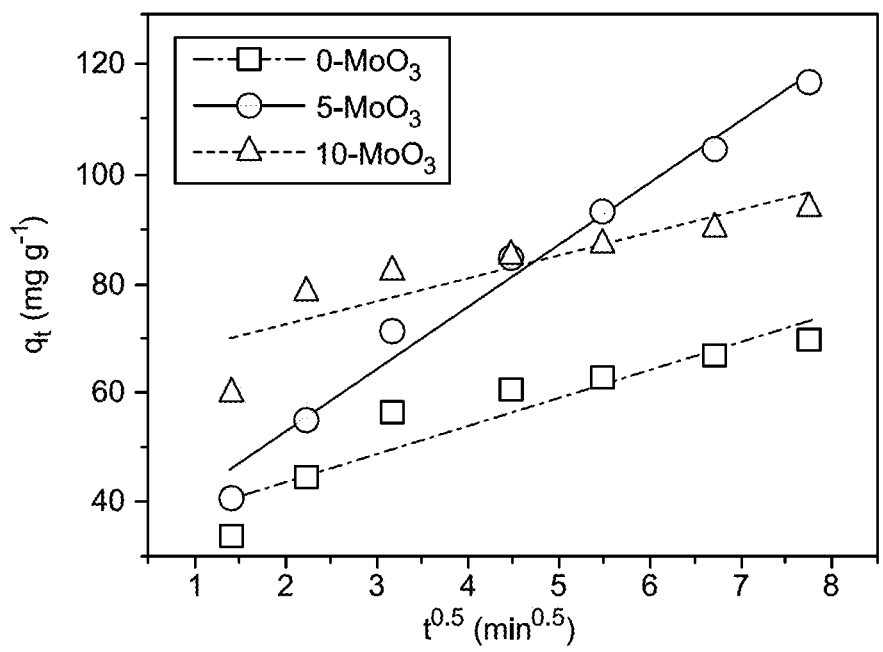
FIG. 7D is a graph depicting kinetic evaluations of CTTC adsorption onto the as-prepared 0-$MoO_3$, 5-$MoO_3$, and 10-$MoO_3$ nanocomposite using the intraparticle diffusion model (IDM), according to certain embodiments.

Furthermore, the decreasing 'q' values at constant concentrations as the temperature increased demonstrated the exothermic nature of CTTC removal by the 5-MoO$_3$ heterostructure. Moreover, the pH effect on CTTC adsorption by 5-MoO$_3$ was examined by adjusting the pollutant solution to the desired pH using 0.1 M hydrochloric acid and/or 0.1 M sodium hydroxide solutions. FIG. 6C illustrates that the CTTC adsorption onto 5-MoO$_3$ showed a 'q$_t$' variation of ±10.0 mg g$^{-1}$ within the tested pH range, with the desirable 'q$_t$' occurring at pH 7. The obtained results demonstrated the capability of the 5-MoO$_3$ to adsorb CTTC regardless of the pH of effluent, with a preference for neutral media. The results may be attributed to the chemical structure of the CTTC, as shown in FIG. 6D. The acidic medium may protonate the tertiary nitrogen ketonic carbonyls and the 5-MoO$_3$ surface. The low pH renders the benzene ring and the alcoholic hydroxyl groups on CTTC as nucleophiles; the electronegativity of chloride may be advantageous for the sorption process. Conversely, in an alkaline medium, the sorbent surface-dominated by —OH ions may repel CTTC sites with negatively charged acidic groups. However, the positively charged tertiary nitrogen group on CTTC may facilitate sorption through electrostatic attraction.

FIGS. 7A-7E display the linear regression graphs of the PSFOM, PSSOM, IPDM (alternatively referred to as 'IDM'), and LFDM (alternatively referred to as 'LDM') of CTTC sorption onto the 0-MoO$_3$, 5-MoO$_3$, and 10-MoO$_3$, respectively. The extracted regression parameters were employed to compute the k$_1$, k$_2$, K$_{IDM}$, and K$_{LDM}$ values [See: A. Naghizadeh and coworkers, *Single-walled carbon nanotubes (SWCNTs) as an efficient adsorbent for removal of reactive dyes from water solution: equilibrium, kinetic, and thermodynamic* and Almufarij, R. S. and coworkers, *Sweep-out of tigecycline, chlortetracycline, oxytetracycline, and doxycycline from water by carbon nanoparticles derived from tissue waste*]. The data listed in Table 4 revealed that CTTC sorption on 0-MoO$_3$, 5-MoO$_3$, and 10-MoO$_3$ followed the PSSOM with good agreement. Furthermore, the rate-control step explored showed that the LDM controlled CTTC sorption onto 0-MoO$_3$ and 10-MoO$_3$, indicating fast pore-diffusion. Conversely, the IDM influenced CTTC sorption onto 5-MoO$_3$, which may be ascribed to the 5-MoO$_3$ tininess of particles [See: H. A. Sallal and coworkers, *Preparation of Al$_2$O$_3$/MgO nanocomposite particles for, bio-applications*].

TABLE 4

The kinetic investigations of CTTC sorption onto 0-MoO$_3$, 5-MoO$_3$, and 10-MoO$_3$ nanocomposites.

| Kinetic model | Parameter | 0-MoO$_3$ | 5-MoO$_3$ | 10-MoO$_3$ |
|---|---|---|---|---|
| q$_e$ exp. (mg g$^{-1}$) | | 96.277 | 150.056 | 125.939 |
| PSFO | q$_e$ cal. (mg g$^{-1}$) | 28.597 | 94.110 | 24.447 |
| | R$^2$ | 0.952 | 0.762 | 0.833 |
| | K$_1$ (min-1) | 0.059 | 0.096 | 0.072 |
| | q$_e$ cal. (mg g$^{-1}$) | 111.740 | 290.847 | 185.328 |
| PSFO | R$^2$ | 0.948 | 0.826 | 0.972 |
| | K$_2$ (g mg$^{-1}$min$^{-1}$) | 0.007 | 0.004 | 0.001 |
| | K$_{LF}$ (min$^{-1}$) | 0.059 | 0.096 | 0.072 |
| LFDM | R$^2$ | 0.952 | 0.762 | 0.833 |
| | K$_{IP}$ (mg g$^{-1}$min$^{0.5}$) | 5.132 | 11.461 | 4.158 |
| IPDM | C (mg g$^{-1}$) | 33.336 | 29.656 | 64.041 |
| | R$^2$ | 0.875 | 0.983 | 0.773 |

The single-multilayered sorption and physisorption-chemisorption possibilities were analysed via the Langmuir model (LM), Freundlich model (FM), and Dubinin-Radushkevich model (DM). Among the sorbents developed, 5-MoO$_3$ showed the best results, thus, CTTC sorption onto 5-MoO$_3$ was examined by using the linearized LM, FM, and DM relations expressed in Equation (10), Equation (11), and Equation (12), respectively.

$$\frac{1}{q_e} = \frac{1}{K_l q_m} \cdot \frac{1}{C_e} + \frac{1}{K_l} \tag{10}$$

$$\ln q_e = \ln K_f + \frac{1}{n} \ln C_e \tag{11}$$

$$\ln q_e = \ln q_m - K_D \varepsilon^2 \tag{12}$$

where 'C$_e$' (mg L$^{-1}$) is CTTC equilibrium concentration, 'q$_m$' is the maximum 'q$_t$', '1/n' is the Freundlich favorability factor, 'K$_x$' (FM and LM) are the equilibrium constants, respectively [See: M. R. Elamin, B. Y. Abdulkhair, A.O.J.A.S.E.J. Elzupir, *Removal of ciprofloxacin and indigo carmine from water by carbon nanotubes fabricated from a* low-cost precursor which is incorporated herein by reference in its entirety]. The ideal gas constant (R) employed while computing the given parameters was 0.0081345 kJ mol⁻¹. The potential of Polanyi (ε) (KJ/mol) was calculated by equation (13), while equation (14) was utilized to compute the Dubinin energy ($E_D$) (kJ/mol), expressed as the energy needed to desorb one molecule from a sorbent site to infinity. The Dubinin constant, denoted as $K_D$ ($Kj^2/mol^{-2}$) was computed from the slope [See: M. A. Al-Ghouti, D. A. Da'ana, *Guidelines for the use and interpretation of adsorption isotherm models*, A. Dada and coworkers, *langmuir, freundlich, temkin and dubinin-radushkevich isotherms studies of equilibrium sorption of $Zn^{2+}$ unto phosphoric acid modified rice husk*, and M. Benjelloun and coworkers, *Recent advances in adsorption kinetic models: their application to dye types* which is incorporated herein by reference in its entirety].

$$\varepsilon = RT\ln\left(1 + \frac{1}{C_e}\right) \quad (13)$$

$$E_D = (2K_D)^{-0.5} \quad (14)$$

Figure 8A:
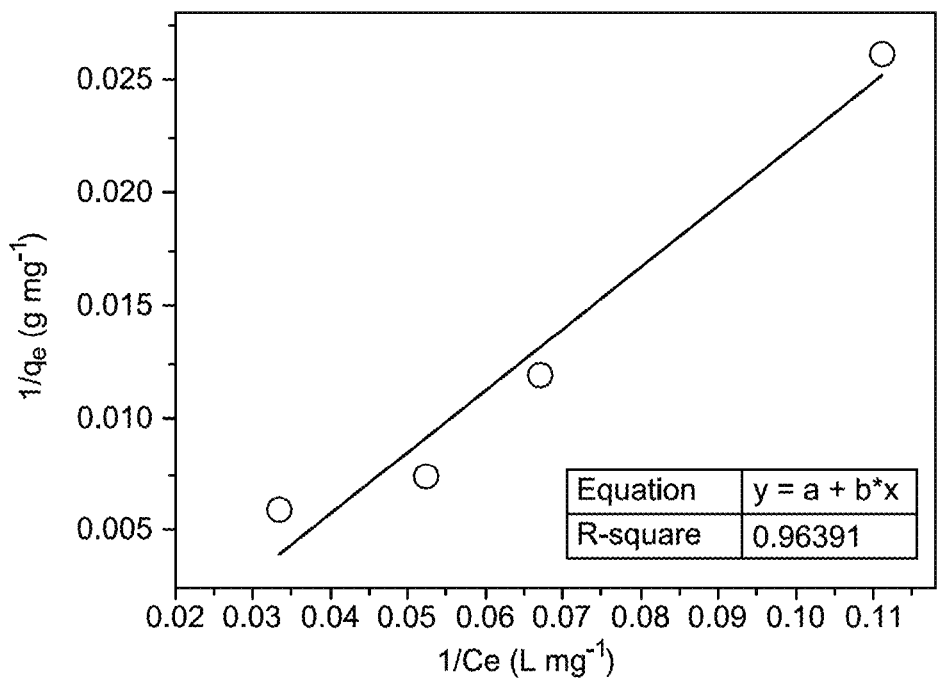
FIG. 8A shows a Langmuir isotherm (LIM) analysis for CTTC adsorption onto the 5-$MoO_3$ nanocomposite at 20° C., according to certain embodiments.
Figure 8B:
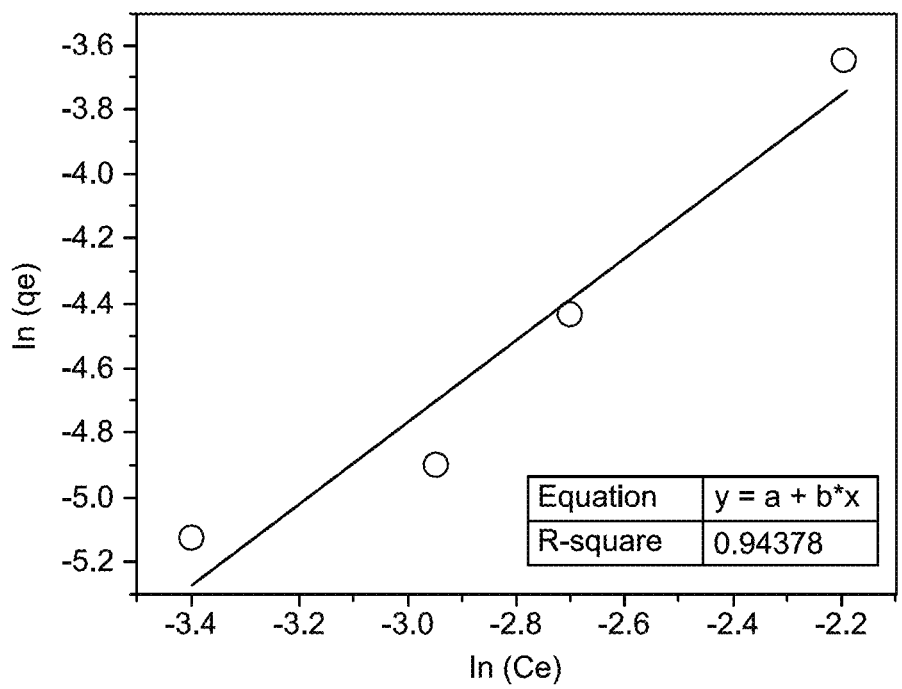
FIG. 8B shows a Freundlich isotherm (FIM) analysis for CTTC adsorption onto the 5-$MoO_3$ nanocomposite at 20° C., according to certain embodiments.
Figure 8C:
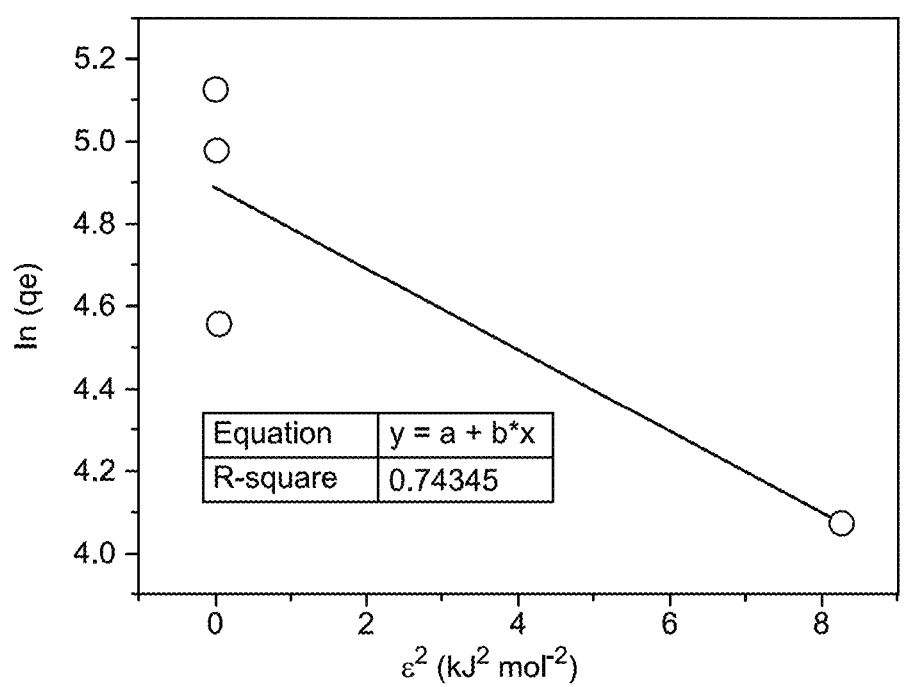
FIG. 8C shows a Dubinin-Radushkevich (DM) isotherm analysis for CTTC adsorption onto the 5-$MoO_3$ nanocomposite at 20° C., according to certain embodiments.

FIGS. 8A-8C show the linear plots of LM, FM, and DM analysed for CTTC sorption onto 5-MoO₃, respectively. The findings listed in Table 5 indicate that CTTC sorption onto 5-MoO₃ had better agreement with the LM. The '1/n' value below unity indicated favorable sorption conditions [See: T. G. Ibrahim, and coworkers, *A thorough examination of the solution conditions and the use of carbon nanoparticles made from commercial mesquite charcoal as a successful sorbent for water remediation*], and the $E_D$ value of less than 9.0 KJ/ted that CTTC removal by 5-MoO₃ occurs through a physisorption process [See: N. Chaouati, A. Soualah, M. Chater, *Adsorption of phenol from aqueous solution onto zeolites Y modified by sialylation*].

$$\ln K_c = \frac{\Delta H^\circ}{RT} + \frac{\Delta S^\circ}{R} \quad (15)$$

$$\Delta G^\circ = \Delta H^\circ - T\Delta S^\circ \quad (16)$$

The negative ΔG° values resulted in the thermodynamic examination indicating spontaneous CTTC sorption onto the 5-MoO₃. The negative ΔH° values demonstrated that 5-MoO₃ removed CTTC from the polluted water through exothermic sorption. Furthermore, the negative ΔS° value in the adsorption process implied increase in order for the in-solution species [See: M. R. Elamin, B. Y. Abdulkhair, A.O.J.A.S.E.J. Elzupir, *Removal of ciprofloxacin and indigo carmine from water by carbon nanotubes fabricated from a low-cost precursor*].

Example 3: Reusability and Samples Treatments

Figure 9A:
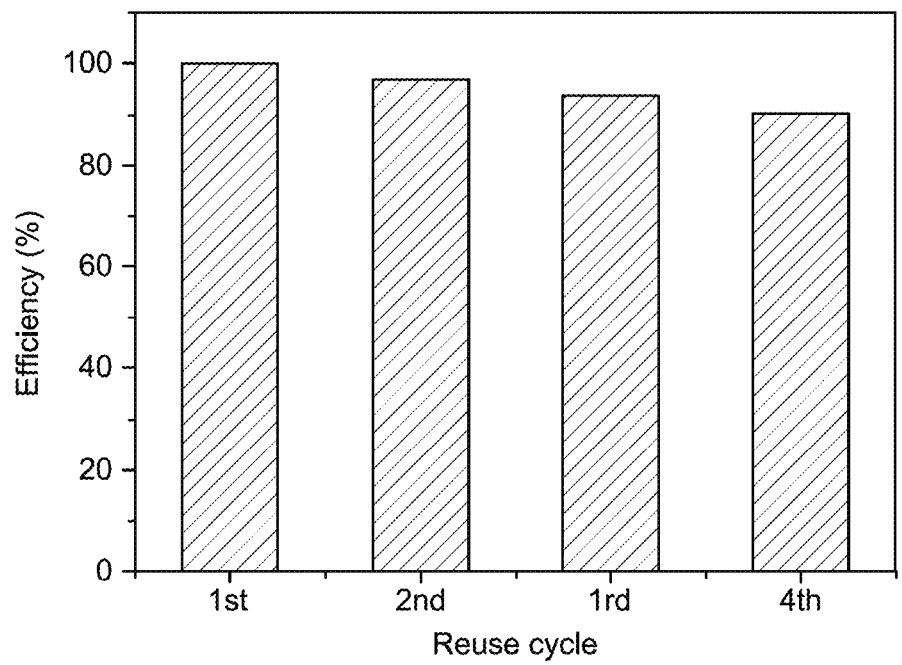
FIG. 9A shows the regeneration and reuse analysis of the 5-$MoO_3$ nanocomposite for removing CTTC over four cycles, according to certain embodiments.

In accordance with the present disclosure, the 5-MoO₃ sorbent was more efficient for the adsorption of CTTC, hence, certain regeneration experiments were conducted with 5-MoO₃. In order to conserve the structure of the synthesized 5-MoO₃, the used sorbent was regenerated using ethanol. The 5-MoO₃ was filtered through a membrane filter, transferred with 10 mL ethanol into a test tube, boiled for 10 min and filtered subsequently. The aforementioned process was replicated by exchanging ethanol with distilled water, dried at 110° C. for 1.0 h, and reused for next round. FIG. 9A shows that the regenerated 5-MoO₃ possessed 90.1% in the fourth cycle compared to the virgin 5-MoO₃ sorbent, indicating the reusability of regenerated 5-MoO₃. The ease of CTTC penetration into 5-MoO₃ internal shells may justify the decrease in the performance of 5-MoO₃ in removing CTTC in the last two cycles.

TABLE 5

The LM, FM, DM, and thermodynamic findings for sorption onto 5-MoO₃ nanocomposites.

| Adsorption isotherms | | | | | | | | | |
|---|---|---|---|---|---|---|---|---|---|
| LM | | | FM | | | | DM | | |
| $R^2$ | $K_L$ (L mg⁻¹) | $q_m$ (mg g⁻¹) | $R^2$ | $K_f$ (L mg⁻¹) | n-1 (a.u.) | $q_m$ (mg g⁻¹) | $K_D$ (mol²/J) | E (KJ/mol) | $R^2$ |
| 0.964 | 1.702 | 134.122 | 0.944 | 0.015 | 0.241 | 133.09 | 0.099 | 2.248 | 0.743 |

| Thermodynamic parameters Fed conc. (mg L⁻¹) | ΔH° (kJmol⁻¹) | ΔS°ΔH° (kJmol⁻¹) | ΔG° (kJmol⁻¹) 298K | ΔG° (kJmol⁻¹) 313 K | ΔG° (kJmol⁻¹) 328K |
|---|---|---|---|---|---|
| 25 | −28.066 | −0.09 | −1.142 | −0.213 | 1.568 |
| 50 | −34.224 | −0.108 | −1.902 | −0.275 | 1.352 |
| 75 | −43.825 | −0.139 | −2.369 | −0.282 | 1.805 |
| 100 | −42.388 | −0.135 | −2.277 | −0.258 | 1.761 |

Figure 8D:
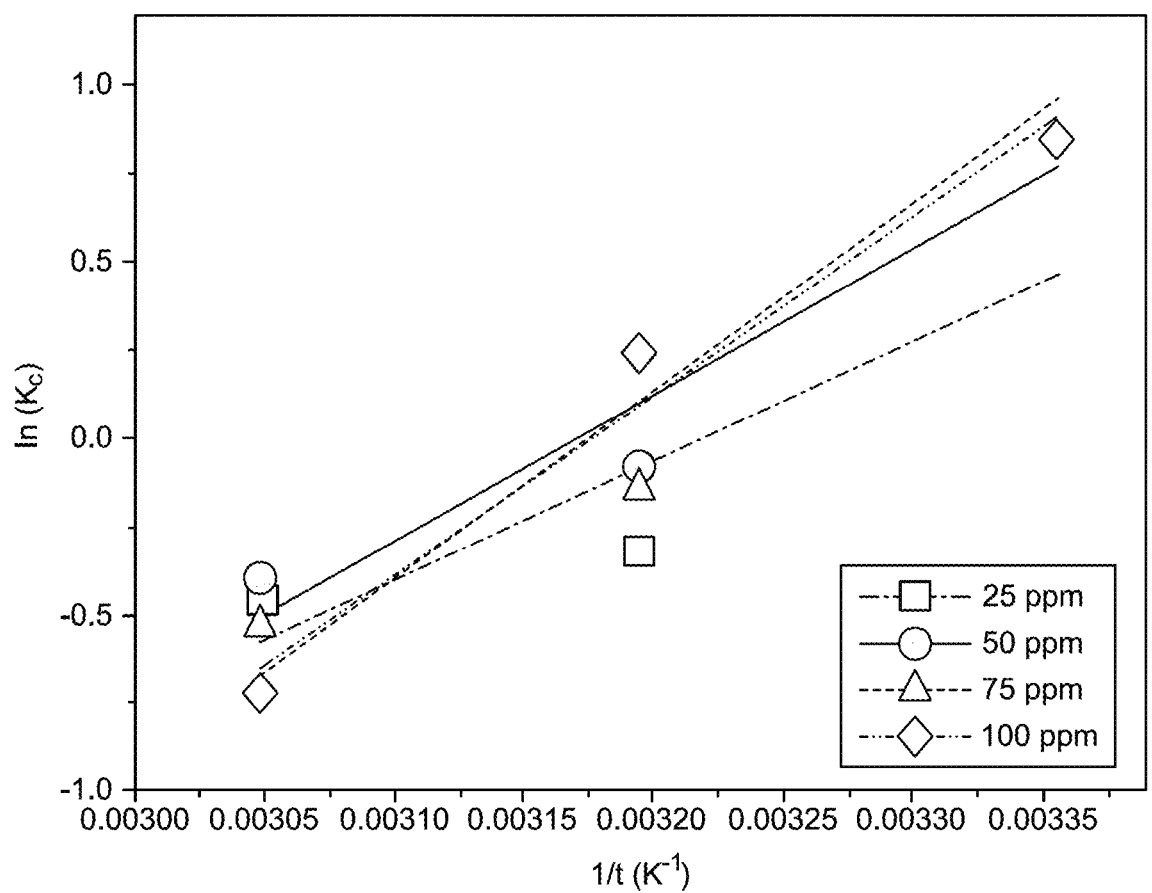
FIG. 8D shows a thermodynamic analysis of CTTC adsorption onto the 5-$MoO_3$ nanocomposite at 298 K, 313 K, and 328 K, according to certain embodiments.

The thermodynamic properties associated with the elimination of CTTC by 5-MoO₃ were examined. The slope and intercept obtained from the graphical representation of equation (15) were employed in calculating the enthalpy (ΔH°) and entropy (ΔS°) values, as shown in FIG. 8D. The Gibbs free energy (ΔG°) was determined via the makeup of the ΔS° and ΔH° values in equation (16), and the findings are listed above in Table 5.

Figure 9B:
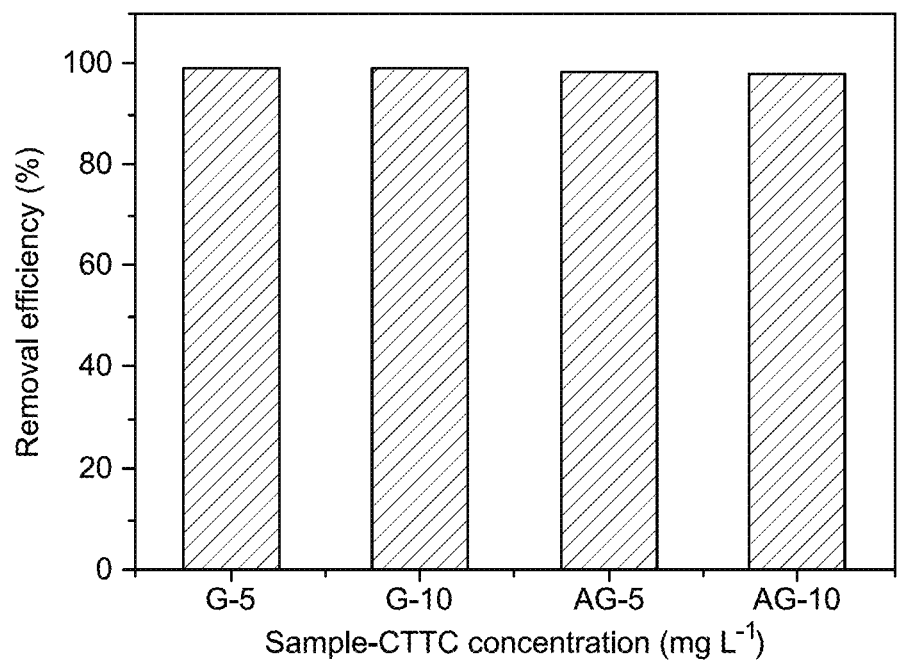
FIG. 9B shows the effectiveness of the 5-$MoO_3$ nanocomposite in removing CTTC from seawater and groundwater samples, according to certain embodiments.

Furthermore, the 5-MoO₃ suitability for CTTC removal was investigated using two water samples. For example, an Arabic Gulf water sample (AG) was obtained from Al-Khobar City, Saudi Arabia, and a groundwater sample (G) was obtained from Sudir City, Saudi Arabia. AG and G were artificially contaminated to achieve CTTC solutions with 5 mg/L and 10 mg/L concentrations. 100 mL of each solution was stirred with 50 mg of 5-MoO₃ for 90 min. The mixture was subsequently filtered through a nylon syringe filter with a pore size of 0.22 micrometers (µm). Further, the absorbance of CTTC was measured using un-spiked samples as blank, and the remaining spiked solutions were employed as standards. FIG. 9B shows the effectiveness of 5-$MoO_3$ in eliminating CTTC from polluted environmental water. The AG samples exhibited a lower sorption percentage than G samples, possibly due to the rivalry between its ingredients, such as salts and the CTTC on 5-$MoO_3$ sites, and/or the slowing down of CTTC diffusion.

The aspects of the present disclosure provide the method of water decontamination. In particular, a practical and straightforward approach for synthesizing nanocomposites with reusability potential, for water decontamination has been described herein. Morphological analysis of the 0-$MoO_3$, 5-$MoO_3$, and 10-$MoO_3$ nanocomposites revealed average particle sizes ranging from 42.8 nm to 54.9 nm, 33.6 nm to 44.5 nm, and 39.3 nm to 44.9 nm, respectively, with corresponding surface areas of 56.8 $m^2/g$, 112.8 $m^2/g$, and 75.6 $m^2/g$. As described above, XRD confirmed the purity of the nanocomposites and the presence of a $MoO_3$ phase in all three samples. CTTC sorption evaluation showed that the 0-$MoO_3$, 5-$MoO_3$, and 10-$MoO_3$ nanocomposites had $q_t$ values of 96.3 mg/g, 150.1 mg/g, and 125.9 mg/g, respectively. Desirable CTTC adsorption occurred within 90 minutes, with the best removal observed at pH 6.0 and 25° C. A 5:12 solution-to-sorbent ratio proved effective for treating CTTC concentrations up to 100 mg/L. Hence, in light of the above-stated experimentation, it may be concluded that the nanocomposites or sorbents developed by the present disclosure are a sustainable yet effective solution for water decontamination. The sorbents described herein are configured to be economically feasible and environmentally friendly, providing long-term solutions for water contamination issues worldwide.

Numerous modifications and variations of the present disclosure are possible in light of the above teachings. It is therefore to be understood that within the scope of the appended claims, the invention may be practiced otherwise than as specifically described herein.

The invention claimed is:

1. A method of water decontamination, comprising:
   contacting a $MoO_3$@$Al_2O_3$—MgO nanocomposite material with an aqueous solution to form a reaction mixture,
   wherein the aqueous solution comprises one or more contaminants,
   mixing the reaction mixture; and
   collecting a filtrate,
   wherein the filtrate has fewer of the one or more contaminants than the aqueous solution,
   wherein the $MoO_3$ content of the $MoO_3$@ $Al_2O_3$—MgO nanocomposite material is in a range from 1 to 20 wt. % of the total weight of the $MoO_3$@$Al_2O_3$—MgO nanocomposite material, and
   wherein the $MoO_3$@$Al_2O_3$—MgO nanocomposite material has a surface area of greater than or equal to 50 $m^2/g$.

2. The method of claim 1, wherein the $MoO_3$ content of the $MoO_3$@ $Al_2O_3$—MgO nanocomposite material is in a range from 3 to 12 wt. % of the total weight of the $MoO_3$@$Al_2O_3$—MgO nanocomposite material.

3. The method of claim 2, wherein the $MoO_3$ content of the $MoO_3$@$Al_2O_3$—MgO nanocomposite material is in a range from 5 to 10 wt. % of the total weight of the $MoO_3$@$Al_2O_3$—MgO nanocomposite material.

4. The method of claim 1, wherein the $MoO_3$@$Al_2O_3$—MgO nanocomposite material has a surface area of greater than or equal to 70 $m^2/g$.

5. The method of claim 4, wherein the $MoO_3$@$Al_2O_3$—MgO nanocomposite material has a surface area of greater than or equal to 100 $m^2/g$.

6. The method of claim 1, wherein the adsorption capacity of the $MoO_3$@ $Al_2O_3$—MgO nanocomposite material for chlortetracycline is greater than or equal to 90 mg/g.

7. The method of claim 6, wherein the adsorption capacity of the $MoO_3$@ $Al_2O_3$—MgO nanocomposite material for chlortetracycline is greater than or equal to 120 mg/g.

8. The method of claim 1, wherein the average pore diameter of the $MoO_3$@ $Al_2O_3$—MgO nanocomposite material is greater than or equal to 8 angstroms.

9. The method of claim 8, wherein the average pore diameter of the $MoO_3$@$Al_2O_3$—MgO nanocomposite material is greater than or equal to 10 angstroms.

10. The method of claim 1, wherein the specific pore volume of the $MoO_3$@ $Al_2O_3$—MgO nanocomposite material is greater than or equal to 0.300 $cm^3 \cdot g^{-1}$.

11. The method of claim 10, wherein the specific pore volume of the $MoO_3$@$Al_2O_3$—MgO nanocomposite material is greater than or equal to 0.425 $cm_3 \cdot g^{-1}$.

12. A method for synthesizing a $MoO_3$@$Al_2O_3$—MgO nanocomposite material, comprising:
   adding distilled water and $HNO_3$ to a powder mixture of $Al(NO_3)_3 \cdot 9H_2O$, $Mg(Ac)_2 \cdot 4H_2O$, $MoO_3$, and sucrose to form a reaction mixture;
   heating the reaction mixture to a reaction temperature in a range of 150 to 200° C.;
   reacting the reaction mixture at the reaction temperature until a carbonized product is formed;
   grinding the carbonized product to form a ground carbonized product; and
   calcining the ground carbonized product at a temperature in a range from 700 to 800° C. for a period of 2 to 4 hours to form the $MoO_3$@$Al_2O_3$—MgO nanocomposite material.

13. The method of claim 12, wherein the $MoO_3$ content of the $MoO_3$@ $Al_2O_3$—MgO nanocomposite material is in a range from 1 to 20 wt. % of the total weight of the $MoO_3$@$Al_2O_3$—MgO nanocomposite material.

14. The method of claim 13, wherein the $MoO_3$ content of the $MoO_3$@$Al_2O_3$—MgO nanocomposite material is in a range from 5 to 10 wt. % of the total weight of the $MoO_3$@$Al_2O_3$—MgO nanocomposite material.

15. The method of claim 12, wherein the $MoO_3$@$Al_2O_3$—MgO nanocomposite material has a surface area of greater than or equal to 70 $m^2/g$.

16. The method of claim 15, wherein the $MoO_3$@$Al_2O_3$—MgO nanocomposite material has a surface area of greater than or equal to 100 $m^2/g$.

17. The method of claim 12, wherein the adsorption capacity of the $MoO_3$@$Al_2O_3$—MgO nanocomposite material for chlortetracycline is greater than or equal to 90 mg/g.

18. The method of claim 17, wherein the adsorption capacity of the $MoO_3$@$Al_2O_3$—MgO nanocomposite material for chlortetracycline is greater than or equal to 120 mg/g.

19. The method of claim 12, wherein the average pore diameter of the $MoO_3$@ $Al_2O_3$—MgO nanocomposite material is greater than or equal to 8 angstroms.

20. The method of claim 12, wherein the specific pore volume of the $MoO_3$@$Al_2O_3$—MgO nanocomposite material is greater than or equal to 0.300 $cm^3 \cdot g^{-1}$.

* * * * *